(12) United States Patent
Bjornson et al.

(10) Patent No.: US 8,968,579 B2
(45) Date of Patent: Mar. 3, 2015

(54) SYSTEM, APPARATUS AND PROCESS FOR EXTRACTION OF BITUMEN FROM OIL SANDS

(75) Inventors: Bradford E. Bjornson, Lethbridge (CA); Craig Aaron Strand, Fort McMurray (CA); William Nicholas Garner, Fort McMurray (CA); John Khai-Quang Diep, Burnaby (CA); Darwin Edward Kiel, New Westminster (CA); Thomas Charles Hann, Onoway (CA)

(73) Assignee: Suncor Energy Inc., Alberta (CA)

( * ) Notice: Subject to any disclaimer, the term of this patent is extended or adjusted under 35 U.S.C. 154(b) by 270 days.

(21) Appl. No.: 13/554,579

(22) Filed: Jul. 20, 2012

(65) Prior Publication Data

US 2013/0098805 A1    Apr. 25, 2013

Related U.S. Application Data

(63) Continuation of application No. 11/938,226, filed on Nov. 9, 2007, now Pat. No. 8,225,944, which is a continuation-in-part of application No. 11/595,817, filed on Nov. 9, 2006, now Pat. No. 8,096,425.

(30) Foreign Application Priority Data

Nov. 9, 2005  (CA) .................................. 2526336

(51) Int. Cl.
| | | |
|---|---|---|
| *B01D 21/06* | (2006.01) | |
| *B01D 17/028* | (2006.01) | |
| *C10G 1/00* | (2006.01) | |
| *B03B 9/02* | (2006.01) | |
| *B01D 21/24* | (2006.01) | |
| *B03D 1/08* | (2006.01) | |
| *B01D 21/00* | (2006.01) | |
| *B03D 1/14* | (2006.01) | |
| *B01D 17/02* | (2006.01) | |
| *C10G 1/04* | (2006.01) | |
| *E21C 47/00* | (2006.01) | |

(52) U.S. Cl.
CPC ................ *C10G 1/002* (2013.01); *B01D 21/24* (2013.01); *B03D 1/082* (2013.01); *B01D 21/0087* (2013.01); *B03D 2203/006* (2013.01); *B03D 1/1456* (2013.01); *B01D 17/0214* (2013.01); *B03D 1/1462* (2013.01); *B01D 21/0042* (2013.01); *B03D 1/1493* (2013.01); *B03B 9/02* (2013.01); *C10G 1/047* (2013.01); *E21C 47/00* (2013.01); *C10G 2300/4068* (2013.01); *C10G 2300/805* (2013.01)
USPC ........... 210/802; 208/391; 208/425; 210/803; 210/804; 210/703; 210/776; 210/799; 210/534; 210/532.1; 210/538; 210/521; 210/540; 210/528; 210/801

(58) Field of Classification Search
CPC .. B03D 1/1412; B03D 1/1462; B03D 1/1481; B03D 1/1493; B03D 1/1456; B03D 1/082; B03D 1/085; B03D 1/087; B03D 1/06; B03D 2203/006; B03B 5/28; B03B 5/60; B03B 5/64; B03B 9/02; B03B 2011/004; B01D 17/0208; B01D 17/0211; B01D 17/0214; B01D 21/0027; B01D 21/003; B01D 21/0039; B01D 21/0042; B01D 21/0045; B01D 21/006; B01D 21/0066; B01D 21/0084; B01D 21/0087; B01D 21/2416; B01D 21/24; B01D 21/2444; B01D 2021/0078; C10G 1/002; C10G 1/045; C10G 1/047; C10G 1/04; C10G 2300/805; C10G 2300/4068; C02F 1/24; C02F 1/006; C02F 2001/007; C02F 2101/32; C02F 2101/325; C02F 2103/10; C02F 2103/36; C02F 2103/365
USPC ......... 210/702–703, 708, 738, 776, 799, 800, 210/801, 802, 803, 804, 806, 741, 120, 188, 210/513, 519, 520, 521, 522, 523, 526, 528, 210/532.1, 533, 534, 535, 536, 537, 538, 210/540; 208/390–391, 187, 425; 196/46, 196/46.1
See application file for complete search history.

(56) References Cited

U.S. PATENT DOCUMENTS

| | | | |
|---|---|---|---|
| 1,431,367 A | 10/1922 | Buchi | |
| 2,726,729 A | 12/1955 | Williams | 183/2.7 |
| 2,910,424 A | 10/1959 | Tek et al. | |
| 3,419,145 A | 12/1968 | Celis | |
| 3,607,720 A | 9/1971 | Paulson | |
| 3,808,120 A | 4/1974 | Smith | |
| 3,956,417 A | 5/1976 | Franz et al. | |
| 3,962,070 A | 6/1976 | Stotler | |
| 3,971,718 A | 7/1976 | Reid | |
| 3,972,861 A | 8/1976 | Gardner, Jr. et al. | |
| 4,017,263 A | 4/1977 | Holmes et al. | |
| 4,035,282 A | 7/1977 | Stuchberry et al. | |
| 4,036,664 A | 7/1977 | Priebe | |
| 4,072,609 A | 2/1978 | Kizior | |
| 4,090,943 A | 5/1978 | Moll et al. | |
| 4,139,646 A | 2/1979 | Gastrock | |
| 4,146,534 A | 3/1979 | Armstrong | |
| 4,216,085 A | 8/1980 | Chittenden | |
| 4,216,796 A | 8/1980 | Gastrock | |
| 4,279,743 A | 7/1981 | Miller | |
| 4,337,143 A | 6/1982 | Hanson et al. | |
| 4,383,914 A | 5/1983 | Kizior | |
| 4,397,741 A | 8/1983 | Miller | |
| 4,399,027 A | 8/1983 | Miller | |
| 4,514,305 A | 4/1985 | Filby | |
| 4,545,892 A | 10/1985 | Cymbalisty et al. | |
| 4,556,422 A | 12/1985 | Reynolds et al. | |
| 4,581,142 A | 4/1986 | Fladby et al. | |
| 4,604,988 A | 8/1986 | Rao | |
| 4,744,890 A | 5/1988 | Miller et al. | |
| 4,838,434 A | 6/1989 | Miller et al. | |
| 4,851,123 A | 7/1989 | Mishra | |
| 4,859,317 A | 8/1989 | Shelfantook et al. | |
| 4,914,017 A | 4/1990 | Mifune | |
| 4,994,097 A | 2/1991 | Brouwers | |
| 5,032,275 A | 7/1991 | Thew | |
| 5,035,910 A | 7/1991 | Jones | |
| 5,037,558 A | 8/1991 | Kalnins | |
| 5,055,202 A | 10/1991 | Carroll et al. | |
| 5,062,955 A | 11/1991 | Sciamanna | |
| 5,066,407 A | 11/1991 | Furlow | |
| 5,071,556 A | 12/1991 | Kalnins et al. | |
| 5,071,557 A | 12/1991 | Schubert et al. | |
| 5,073,177 A | 12/1991 | Brouwers | |
| 5,090,498 A | 2/1992 | Hamill | |
| 5,110,471 A | 5/1992 | Kalnins | |
| 5,118,408 A | 6/1992 | Jansen et al. | |
| 5,143,598 A | 9/1992 | Graham et al. | |
| 5,207,805 A | 5/1993 | Kalen et al. | |
| 5,223,148 A | 6/1993 | Tipman et al. | |
| 5,242,580 A | 9/1993 | Sury | |
| 5,242,604 A | 9/1993 | Young et al. | |
| 5,264,118 A | 11/1993 | Cymerman et al. | |
| 5,302,294 A | 4/1994 | Schubert et al. | |
| 5,316,664 A | 5/1994 | Gregoli et al. | |
| 5,340,467 A | 8/1994 | Gregoli et al. | |
| 5,350,525 A | 9/1994 | Shaw et al. | |
| 5,458,770 A | 10/1995 | Fentz | |
| 5,538,631 A | 7/1996 | Yeh | |
| 5,554,301 A | 9/1996 | Rippetoe et al. | |
| 5,556,545 A | 9/1996 | Volchek et al. | |
| 5,620,594 A | 4/1997 | Smith et al. | |
| 5,667,543 A | 9/1997 | Brouwers | |
| 5,667,686 A | 9/1997 | Schubert | |
| 5,711,374 A | 1/1998 | Kjos | |
| 5,740,834 A | 4/1998 | Sherowski | |
| 5,766,484 A | 6/1998 | Petit et al. | |
| 5,840,198 A | 11/1998 | Clarke | |
| 5,879,541 A | 3/1999 | Parkinson | |
| 5,958,256 A | 9/1999 | Ocel, Jr. et al. | |
| 5,965,023 A | 10/1999 | Schaller | |
| 5,996,690 A | 12/1999 | Shaw et al. | |
| 6,077,433 A | 6/2000 | Brun Henriksen et al. | |
| 6,119,870 A | 9/2000 | Maciejewski et al. | |
| 6,189,613 B1 | 2/2001 | Chachula et al. | |
| 6,197,095 B1 | 3/2001 | Ditria et al. | |
| 6,213,208 B1 | 4/2001 | Skilbeck | |
| 6,322,845 B1 | 11/2001 | Dunlow | |
| 6,346,069 B1 | 2/2002 | Collier | |
| 6,378,608 B1 | 4/2002 | Nilsen et al. | |
| 6,398,973 B1 | 6/2002 | Saunders et al. | |
| 6,468,330 B1 | 10/2002 | Irving et al. | |
| 6,543,537 B1 | 4/2003 | Kjos | |
| 6,596,170 B2 | 7/2003 | Tuszko et al. | |
| 6,607,437 B2 | 8/2003 | Casey et al. | |
| 6,702,877 B1 | 3/2004 | Swanborn | |
| 6,719,681 B2 | 4/2004 | Collier | |
| 6,730,236 B2 | 5/2004 | Kouba | |
| 6,800,116 B2 | 10/2004 | Stevens et al. | |
| 6,800,208 B2 | 10/2004 | Bolman | |
| 7,011,219 B2 | 3/2006 | Knox-Holmes et al. | |
| 7,060,017 B2 | 6/2006 | Collier | |
| 8,096,425 B2 | 1/2012 | Bjornson et al. | 210/512.2 |
| 8,168,071 B2 | 5/2012 | Hann | 210/741 |
| 8,225,944 B2 | 7/2012 | Bjornson et al. | 210/532.1 |
| 8,480,908 B2 | 7/2013 | Hann | 210/741 |
| 2001/0005986 A1 | 7/2001 | Matsubara et al. | |
| 2001/0042713 A1 | 11/2001 | Conrad et al. | |
| 2002/0018842 A1 | 2/2002 | Dunlow | |
| 2002/0068673 A1 | 6/2002 | Collier | |
| 2002/0068676 A1 | 6/2002 | Collier | |
| 2002/0148777 A1 | 10/2002 | Tuszko | |
| 2003/0085185 A1 | 5/2003 | Kouba | |
| 2003/0168391 A1 | 9/2003 | Tveiten | |
| 2004/0055972 A1 | 3/2004 | Garner et al. | |
| 2004/0069705 A1 | 4/2004 | Tuszko et al. | |
| 2004/0094456 A1 | 5/2004 | Dries | |
| 2004/0140099 A1 | 7/2004 | Hauge et al. | |
| 2004/0182754 A1 | 9/2004 | Lange | |
| 2004/0192533 A1 | 9/2004 | Collier | |
| 2004/0262980 A1 | 12/2004 | Watson | |
| 2005/0016904 A1 | 1/2005 | Knox-Holmes et al. | |
| 2006/0112724 A1 | 6/2006 | Chang et al. | |
| 2006/0122449 A1 | 6/2006 | van Egmond | |
| 2006/0138036 A1 | 6/2006 | Garner et al. | |
| 2006/0138055 A1 | 6/2006 | Garner et al. | |
| 2012/0085699 A1 | 4/2012 | Bjornson et al. | 210/512.1 |

FOREIGN PATENT DOCUMENTS

| | | |
|---|---|---|
| CA | 518320 | 11/1955 |
| CA | 970308 | 7/1975 |
| CA | 1026252 | 2/1978 |
| CA | 1059052 | 7/1979 |
| CA | 1066644 | 11/1979 |
| CA | 1072473 | 2/1980 |
| CA | 1097574 | 3/1981 |
| CA | 1126187 | 6/1982 |
| CA | 1138822 | 4/1983 |
| CA | 1194622 | 1/1985 |
| CA | 1201412 | 3/1986 |
| CA | 1254171 | 5/1989 |
| CA | 1267860 | 4/1990 |
| CA | 2000984 | 4/1991 |
| CA | 2037856 | 9/1991 |
| CA | 1283465 | 12/1991 |
| CA | 2024756 | 5/1992 |
| CA | 1305390 | 7/1992 |
| CA | 2058221 | 7/1992 |
| CA | 1318273 | 5/1993 |
| CA | 1322177 | 9/1993 |
| CA | 1325180 | 12/1993 |
| CA | 2088227 | 4/1994 |
| CA | 2108521 | 4/1994 |
| CA | 2086073 | 6/1994 |
| CA | 2155198 | 8/1994 |
| CA | 2184613 | 11/1995 |
| CA | 2180686 | 2/1997 |
| CA | 2231543 | 3/1997 |
| CA | 2263691 | 3/1998 |
| CA | 2249679 | 4/1999 |
| CA | 2308410 | 5/1999 |
| CA | 2236183 | 10/1999 |
| CA | 2246841 | 3/2000 |

| | | |
|---|---|---|
| CA | 2365008 | 8/2000 |
| CA | 2298122 | 7/2001 |
| CA | 2090618 | 10/2001 |
| CA | 2358805 | 10/2001 |
| CA | 2311738 | 11/2001 |
| CA | 2409129 | 11/2001 |
| CA | 2315596 | 2/2002 |
| CA | 2332207 | 2/2002 |
| CA | 857306 | 3/2002 |
| CA | 873854 | 3/2002 |
| CA | 882667 | 3/2002 |
| CA | 910271 | 3/2002 |
| CA | 2217300 | 8/2002 |
| CA | 2419325 | 8/2003 |
| CA | 2435113 | 1/2005 |
| CA | 2436158 | 1/2005 |
| CA | 2439436 | 3/2005 |
| CA | 2532737 | 3/2005 |
| CA | 2535702 | 3/2005 |
| CA | 2537603 | 3/2005 |
| CA | 2483896 | 4/2005 |
| CA | 2493677 | 6/2005 |
| CA | 2549895 | 6/2005 |
| CA | 2554725 | 6/2005 |
| CA | 2454942 | 7/2005 |
| CA | 2455623 | 7/2005 |
| CA | 2462359 | 9/2005 |
| CA | 2558424 | 10/2005 |
| CA | 2467372 | 11/2005 |
| CA | 2565980 | 12/2005 |
| CA | 2510099 | 1/2006 |
| CA | 2517811 | 2/2006 |
| CA | 2538464 | 2/2006 |
| CA | 2563922 | 3/2006 |
| CA | 2520943 | 4/2006 |
| CA | 2522031 | 4/2006 |
| CA | 2580836 | 4/2006 |
| CA | 2582078 | 4/2006 |
| CA | 2506398 | 5/2006 |
| CA | 2587866 | 6/2006 |
| CA | 2494391 | 7/2006 |
| CN | 1112033 | 11/1995 |
| CN | 2263552 Y | 10/1997 |
| CN | 2520942 Y | 11/2002 |
| CN | 1701856 | 11/2005 |
| EP | 262916 | 6/1988 |
| EP | 355127 | 6/1989 |
| EP | 332641 | 3/1994 |
| EP | 605746 | 7/1994 |
| EP | 1600215 | 11/2005 |
| EP | 1501636 | 8/2006 |
| GB | 195055 | 1/1924 |
| GB | 726841 | 3/1955 |
| GB | 814610 | 6/1959 |
| GB | 1302064 | 1/1973 |
| GB | 2047735 | 1/1980 |
| GB | 2075543 | 11/1981 |
| GB | 2088234 A | 6/1982 |
| GB | 2116447 | 9/1983 |
| JP | 61082856 | 4/1986 |
| WO | WO 94/23823 | 10/1994 |
| WO | WO 00/74815 | 12/2000 |
| WO | WO 03/068407 | 8/2003 |
| WO | WO 03/092901 | 11/2003 |
| WO | WO 2004/005673 | 1/2004 |
| WO | WO 2005/044871 | 5/2005 |
| WO | WO 2006/085759 | 8/2006 |

OTHER PUBLICATIONS

Definition of "Lateral", Merriam-Webster Online Dictionary, Accessed Mar. 10, 2011, pp. 1-3.
Rimmer, et al. "Hydrocyclone-Based Process for Rejecting Solids from Oil Sands at the Mine Site while Retaining Bitumen Transportation to a Processing Plant"; paper delivered on Monday Apr. 5, 1993 at a conference in Alberta, Canada entitled "Oil Sands—Our Petroleum Future.".
National Energy Board, Canada's Oil Sands: A Supply and Market Outlook to 2015, An Energy Market Assessment Oct. 2000.
Krebs' Engineers, Krebs D-Series gMAX DeSanders for Oil and Gas, Bulletin 11-203WEL.
Eva Mondt "Compact Centrifugal Separator of Dispersed Phases" Proefschrift.
Natural Resources Canada, Treatment of Bitumen Froth and Slop Oil Tailings.
Restriction Requirement dated Dec. 12, 2008 for U.S. Appl. No. 11/595,817.
Office Action dated Mar. 2, 2009 for U.S. Appl. No. 11/595,817.
Office Action dated Jul. 21, 2009 for U.S. Appl. No. 11/595,817.
Office Action dated Jan. 21, 2010 for U.S. Appl. No. 11/595,817.
Office Action dated Aug. 6, 2010 for U.S. Appl. No. 11/595,817.
Office Action dated Mar. 17, 2011 for U.S. Appl. No. 11/595,817.
Notice of Allowance dated Sep. 16, 2011 for U.S. Appl. No. 11/595,817.
Restriction Requirement dated Feb. 24, 2011 for U.S. Appl. No. 11/938,226.
Office Action dated Jul. 28, 2011 for U.S. Appl. No. 11/938,226.
Office Action dated Dec 29, 2011 for U.S. Appl. No. 11/938,226.
Office Action dated Sep. 12, 2012 for U.S. Appl. No. 13/460,571.
Restriction Requirement dated Oct. 4, 2011 for U.S. Appl. No. 12/277,261.
Office Action dated Sep. 5, 2012 for U.S. Appl. No. 13/329,177.
Office Action dated Jan. 25, 2013 for U.S. Appl. No. 13/329,177.

*Primary Examiner* — David C Mellon
(74) *Attorney, Agent, or Firm* — Knobbe, Martens, Olson & Bear, LLP

(57) ABSTRACT

A separation process and system for extracting hydrocarbons from a mixture. In some embodiments, a process for separating a bitumen froth stream containing bitumen froth, water and fine solids into a bitumen enriched froth stream and a water and fine solids stream, comprises: (a) receiving the bitumen froth stream in a concentrator vessel, (b) distributing the bitumen froth stream in the concentrator vessel as a substantially uniform and generally horizontal flow of the bitumen froth stream at a first flow velocity, (c) slowing the bitumen froth stream to a second flow velocity, slower than the first flow velocity, in a separation region of the concentrator vessel to promote separation of the bitumen froth from the water and fine solids, and then (d) collecting a bitumen enriched froth stream and (e) collecting a separate water and fine solids stream. Related embodiments of systems and apparatus may also be provided.

27 Claims, 10 Drawing Sheets

SYSTEM, APPARATUS AND PROCESS FOR EXTRACTION OF BITUMEN FROM OIL SANDS

This application is a continuation of U.S. application Ser. No. 11/938,226, filed Nov. 9, 2007, which is a continuation-in-part of U.S. application Ser. No. 11/595,817, filed Nov. 9, 2006, which claims priority under 35 U.S.C. §119(e) to Canadian Application No. 2,526,336, filed Nov. 9, 2005.

FIELD OF THE INVENTION

This invention relates to systems and methods for extracting hydrocarbons from a mixture that includes solids and water. More particularly, the invention relates to a system and method for extracting bitumen from a hydro-transport slurry created to facilitate movement of bitumen contained in oil sands from a mining site to a processing site.

BACKGROUND OF THE INVENTION

Oil sands, also referred to as tar sands or bituminous sands, are a combination of solids (generally mineral components such as clay, silt and sand), water, and bitumen. Although the term "sand" is commonly used to refer to the mineral components of the mixture, it is well known that this term is meant to include various other components such as clay and silts. Technically speaking, the bitumen is neither oil nor tar, but a semisolid form of oil which will not flow toward producing wells under normal conditions, making it difficult and expensive to produce. Oil sands are mined to extract the oil-like bitumen which is processed further at specialized refineries. Conventional oil is extracted by drilling traditional wells into the ground whereas oil sand deposits are mined using strip mining techniques or persuaded to flow into producing wells by techniques such as steam assisted gravity drainage (SAGD) or cyclic steam stimulation (CSS) which reduce the bitumen's viscosity with steam and/or solvents.

Various methods and equipment have been developed over many years for mining oil sands and for extracting desired hydrocarbon content from the mined solids.

Conventional oil sand extraction processes involve the following steps:

a) Excavation of the oil sand from a mine face as a volume of ore material. Generally, this is done using conventional strip mining techniques and equipment.

b) Comminution of the ore material to reduce it to conveyable size for conveying from the mine face.

c) Combining the comminuted material with water to form a slurry. Generally, the slurry is formed with hot water, and, optionally other additives.

d) Pumping the slurry to a primary separation facility to separate the mineral from the hydrocarbon components. The pumping step is generally referred to as a "hydro-transport" process. During the slurry formation and hydro-transport process, large constituents in the ore material are further reduced in size, or ablated, and the process of bitumen separation from the solid mineral components is commenced. These effects are referred to as "conditioning" of the slurry.

e) Separating the bulk of the hydrocarbon (i.e. bitumen) content from the mineral component in one or more "primary separation vessels" (PSV) wherein the bitumen portion is entrained in a froth that is drawn off from the surface of the slurry while a significant portion of the mineral is removed as a solids or tailings stream.

f) Hydraulic transport of the tailings to a designated tailings disposal site.

g) Recovery and recycling of clarified water back to the process when released from the tailings slurry within the tailings disposal site.

The above separation and froth concentration steps constitute initial primary extraction of the oil sands to separate the bitumen from the mineral component. The bitumen froth that results after application of the above steps is then delivered to secondary treatment steps that further concentrate and upgrade the bitumen to produce a suitable feed for upgrading to synthetic crude oil or for refining into petroleum products.

Various other intervening steps are also known in the primary extraction process such as withdrawal of a middlings layer from the PSV and oil recovery from tailings by cyclones and flotation to further increase the yield of bitumen from the ore material.

As will be known to persons skilled in the art, the large-scale nature of oil sands mining requires processing facilities of an immense size. As such, these facilities are generally fixed in position. For this reason, transport of the ore material between the various above-mentioned steps generally involves the use of trucks, conveyors, or pipelines or various other known equipment. However, as operations continue, it will be appreciated that the mine face normally recedes further away from the permanent facilities. This, therefore, increases the transport distances and time resulting in increased operating and maintenance costs and environmental impact.

There exists therefore a need to increase the efficiency of at least the transport and primary extraction processes to reduce operating costs. One suggestion that has been proposed is for having one or more of the excavating equipment to be mobile so as to follow the receding mine face. An example of this method is taught in Canadian application number 2,453,697, wherein the excavating and crushing equipment is made mobile so as to advance along with the mine face. The crushed ore is then deposited onto a conveyor, which then transports the ore to a separation facility. This reference also teaches that the conveyor and separation facility can periodically be relocated to a different site once the mine face advances a sufficient distance. However, such relocation, particularly of the separation facility including large gravity separation vessels would involve considerable time, expense and lost production.

Another problem faced with respect to oil sand mining involves the fact that sand constitutes the primary weight fraction of the mineral component of the mined ore material. Thus, it is desirable to separate the minerals as soon as possible "upstream" so as to minimize transport costs. In addition, the transport of mineral components results in considerable wear on the transport mechanisms, which further increases operating and maintenance costs. As well, long hydro-transport distances can over condition the oil sand causing bitumen recoveries to decline as the distances increase. At the same time, separation of the bitumen and mineral components must be done in such a way as to maximize bitumen yield from the ore material.

Thus, there exists a need for an efficient primary extraction process to separate bitumen from the mineral components, preferably in proximity to the mine face to reduce transport costs. The present invention seeks to alleviate at least some of the problems associated with the prior art by providing a novel system and method for extracting the bitumen from a hydro-transport slurry to create an intermediate bitumen froth suitable for further processing. The system of the present invention is preferably mobile so that the primary extraction process can move with the mine face, however, it is also contemplated that the system can be retrofitted to existing fixed primary treatment facilities to improve the operational efficiency of such fixed facilities.

SUMMARY OF THE INVENTION

According to one aspect of the invention, there is provided an extraction system for extracting bitumen from a slurry containing bitumen, solids and water comprising:

a cyclone separation facility for separating the slurry into a solids component stream and a bitumen froth stream, the bitumen froth stream including bitumen, water and fine solids; and a froth concentration facility for separating the bitumen froth stream into a final bitumen enriched froth stream, and a water and fine solids stream.

In a further aspect, the present invention provides a concentrator vessel for separating a bitumen froth stream containing bitumen froth, water and fine solids into a final bitumen enriched froth stream and a water and fine solids stream, the concentrator vessel comprising:

an inlet region to receive the bitumen froth stream and distribute the bitumen froth stream as a substantially balanced flow across a separation region;

the separation region being adapted to establish uniform, substantially horizontal flow of the bitumen froth stream to promote separation of the bitumen froth from the water and fine solids, the bitumen froth tending to move upwardly to accumulate as a froth layer atop a water layer with the fine solids settling within the water layer; and a froth recovery region in communication with the separation region having an overflow outlet to collect the bitumen froth layer as the bitumen enriched froth stream, and an underflow outlet to collect the water and fine solids as the water and fine solids stream; and a flow level control means to control the level of the water layer within the vessel to permit the overflow outlet to collect the bitumen froth layer despite variations in the volume of the bitumen froth stream.

The extraction system of the present invention is preferably mobile so that the cyclone extraction facility and the froth concentration facility can move with the mine face at an oil sands mining site, however, it is also contemplated that the system can be retrofitted to existing fixed treatment facilities to improve the operational efficiency of such fixed facilities. In this regard, the cyclone extraction component and the froth concentration component may be mobile as separate units or as a combined unit. In addition, a water clarification facility can also be incorporated into the extraction system for separating the water and fine solids stream from the froth concentration facility into a water stream and a fine solids stream.

BRIEF DESCRIPTION OF THE DRAWINGS

Aspects of the present invention are illustrated, merely by way of example, in the accompanying drawings in which:

FIG. 7E is a detail section view taken along line 7E-7E of FIG. 7 showing details of a froth recovery weir to collect froth discharged through the underflow outlet; and.

DESCRIPTION OF THE PREFERRED EMBODIMENTS

Figure 1A:
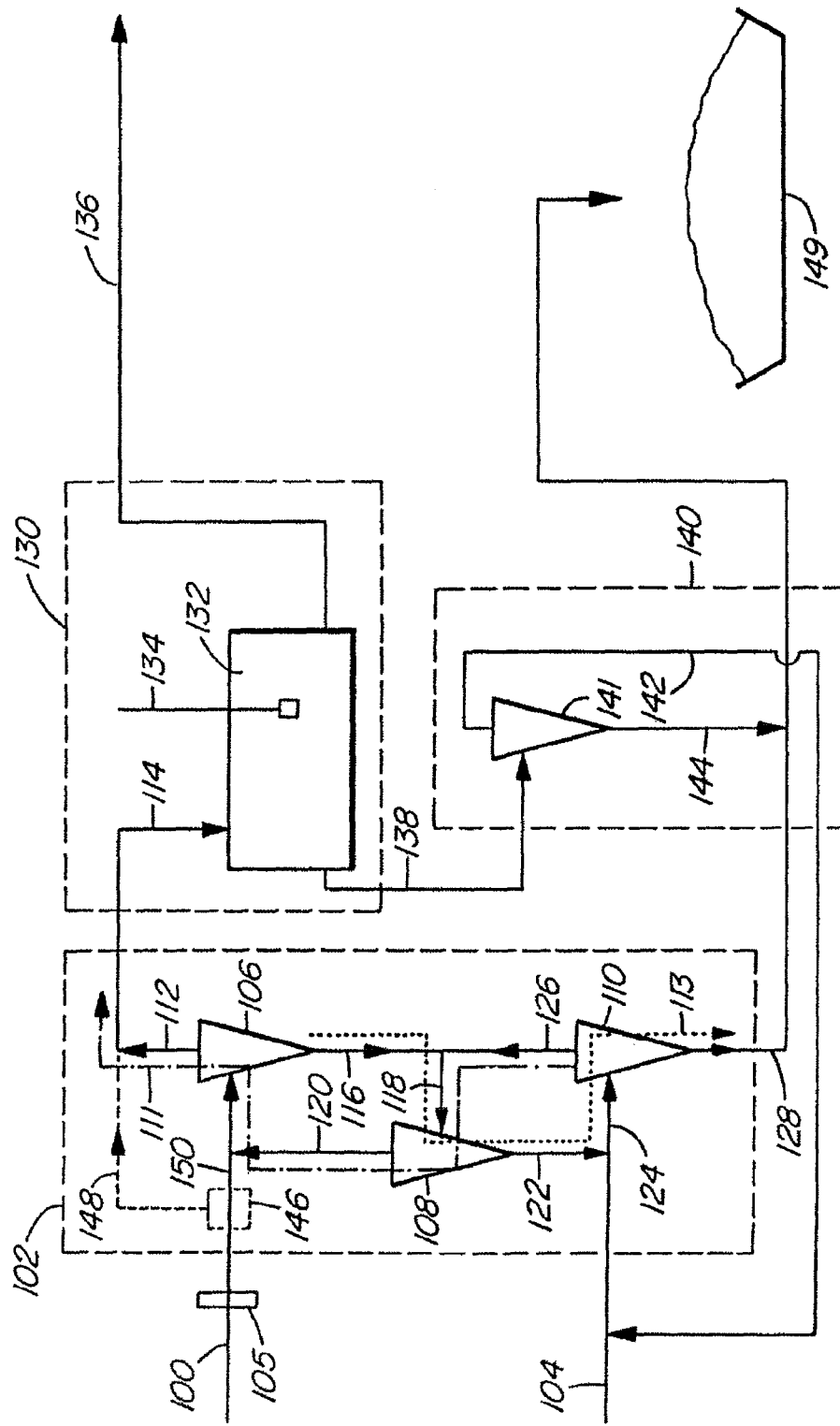
FIG. 1A is a flow diagram showing a first embodiment of the system of the present invention for extracting bitumen from a slurry containing bitumen, solids, and water which makes use of a cyclone separation facility having a three stage countercurrent cyclone configuration.

Referring to FIG. 1A, there is shown a flow diagram of an extraction system according to an aspect of the present invention for extracting bitumen from a conditioned oil sand slurry that includes bitumen, solids and water. This slurry may be created by conventional techniques or by other techniques such as the mobile oil sand excavation and processing system and process described in applicant's co-pending Canadian patent application no. 2,526,336 filed on Nov. 9, 2005 and entitled METHOD AND APPARATUS FOR OIL SANDS ORE MINING. This mobile oil sand excavation and processing system is capable of excavating, comminuting or crushing, and slurrifying oil sand ore and moving with the mine face. In a preferred arrangement, the system and process illustrated in FIG. 1A are designed to be mobile for movement with the mine face and the excavation and ore processing system, however, the present system can also be retrofitted to existing fixed froth treatment facilities to improve the operational efficiency of such fixed facilities.

Initially, the system of FIG. 1A includes a cyclone separation facility 102, also referred to as a de-sanding or, more accurately, a de-mineralising facility for treatment of incoming slurry 100. The cyclone separation facility 102 comprises a plurality of cyclones which aid in de-mineralizing slurry 100. A water feed 104 is also provided to the cyclone separation facility 102 as a water wash to the slurry flow. The water feed 104 may be from an external water source, recycled water from upstream or downstream processes and/or or a mixture of any two or more of these water sources. The cyclone separation facility 102 serves to efficiently separate a large portion of the solids component from the bitumen component, producing a diluted bitumen froth stream 114 (also termed a lean bitumen froth stream), while a large portion of the solids component is separated as a tailings stream 128 from the separation facility 102.

The solids or mineral component of the incoming slurry 100 is a significant portion, by weight, of the excavated ore from the mine site. By way of example, incoming slurry 100 can have a composition within the following ranges: about 5-15% bitumen by weight, about 40-70% solids (minerals) by weight and about 30-75% water by weight. In a typical slurry, the composition will be in the range of about 7-10% bitumen by weight, about 55-60% minerals by weight, and about 35% water by weight. Thus, in order to increase the efficiency of the oil sands strip mining system, removal of much of the solids component (minerals excluding bitumen) is preferentially conducted as close to the mine face as possible. This avoids unnecessary transport of the solids component thereby avoiding the operation and equipment maintenance costs associated with such transport.

In some aspects of the present invention, the incoming slurry 100 may be conditioned so that aerated bitumen is liberated from the sand minerals. This stream may be diluted with water and/or overflow from a downstream cyclone to maintain cyclone feed densities in a preferred range in the order of 1200-1320 kg/m$^3$. Other cyclone feed densities may apply to specific operational or installation requirements for processes described herein.

In one embodiment, cyclone separation facility 102 includes three cyclone separation stages 106, 108 and 110 that are connected in series and, more preferably, in a counter-current arrangement (as discussed below). The cyclone separation stages of each comprise one or more cyclones that are generally vertical units, which have a minimal footprint, thereby occupying a minimal area. In alternative embodiments, cyclone installation may provide for mounting the cyclones on an angle. This may reduce the height used for installation and/or support and may direct the underflow streams to a common pumpbox. This may provide for reduced costs associated with the use of launders. This can be particularly desirable in relation to those embodiments of the present invention which are directed to a mobile cyclone separation facility. Suitable cyclones for the cyclone separation stages include any cyclone capable of separating a significant amount of the solids component from a bitumen based slurry, and include those manufactured by Krebs Engineers (www.krebs.com) under the trademark gMAX®, and those manufactured by sold under the name of Cavex cyclones marketed by Weir Minerals (www.weirminerals.com).

The slurry 100 (including the bitumen and solid components of the ore) is fed to the first cyclone separation stage 106 wherein a first separation of the bitumen froth and solids is conducted in a conventional manner. Optionally, the slurry 100 is processed by a screening and/or comminuting unit 105 before entering the first cyclone separation stage 106 to ensure that solid particles in the slurry can be handled by the cyclone. Rejected solid particles can either be discarded after screening or made smaller by crushing or other suitable techniques. An exemplary sizing roller screen for carrying out the screening and re-sizing process is disclosed in commonly owned co-pending Canadian Patent application no. 2,476,194 filed Jul. 30, 2004 and entitled SIZING ROLLER SCREEN ORE PROCESSING APPARATUS. In the first cyclone separation stage 106, slurry 100 is processed in a conventional manner to produce a first bitumen froth 112, and a first solid tailings stream 116 which comprises significantly less bitumen and substantially more solids than found in the first bitumen froth 112. Bitumen froth 112 is delivered to a diluted froth collection stream 114, while first solid tailings stream 116 is pumped to a feed stream 118 of the second cyclone separation stage 108 where a further cyclone separation process is conducted. The bitumen froth 120 from the second cyclone separation stage 108 is reintroduced to the feed stream 100 supplying the first separation stage 106. The tailings stream 122 from the second cyclone separation stage 108 is combined with the water feed 104 and recycled water 142 to form a feed 124 to the third cyclone separation stage 110. The bitumen froth 126 from the third stage 110 is combined into the feed 118 to the second separation stage 108. The tailings from the third stage 110 form a first tailings stream 128, which may be pumped to a disposal site such as a tailings pond 149.

In the embodiment illustrated in FIG. 1A, the three stage cyclone separation system incorporating a counter-current process and a water feed 104 results in a first flow 111 (dash-dot line in FIG. 1A) of progressively enriched bitumen froth from the downstream cyclone separation stage 110 through the intermediate cyclone separation stage 108 to the upstream cyclone separation stage 106. At the same time, there is an opposite (counter-current) flow 113 (dotted line in FIG. 1A) of mineral tailings from the upstream stage 106 to the intermediate stage 108, and finally to the downstream stage 110. In such a facility, effectively the hydro-transported ore slurry 100 is mixed with a counter-current wash of water to form bitumen froth stream 114 which is then drawn off and further processed to extract the desired hydrocarbons entrained therein. The counter-current water wash of the bitumen flow serves to improve the recovery efficiency of the bitumen. In this system, it will be understood that a three-stage process is preferred. However, it will be apparent to persons skilled in the art that either an addition or reduction in the number of cyclone stages used in the process will also depend upon factors such as the desired recovery of bitumen, the ease of separation of the bitumen from the mineral component, and economic factors involving the usual trade-off between equipment costs and the value of the recovered bitumen product.

In addition, it will be understood that the cyclone separation facility is more efficient when operated in a water wash manner. The term "water wash" refers to the manner in which the slurry and water streams are supplied at opposite ends of a multi-stage process as discussed above. Thus, for example, water entering the process (either make-up or recycled) is first contacted with a bitumen-lean feed. While wash water is shown being introduced at the downstream cyclone separation stage 110, it will be appreciated that wash water 104, or a portion thereof, can also be introduced at the other cyclone separation stages depending on the ore grade.

A further advantage of the multi-stage cyclone separation facility illustrated in FIG. 1A lies in the fact that size of the component facility may be reduced since the multi-stage counter-current process results in a separation efficiency roughly equivalent to a much larger, single PSV stage system. For this reason, embodiments of the multi-stage facility of the present invention may be mounted on a mobile platform or on movable platforms and, in the result, such facility may be made moveable along with the oil sands mine face. However, the multi-stage cyclone separation facility may also be configured in a fixed arrangement.

In view of the comments above, the cyclone separation facility 102 illustrated in FIG. 1A is preferably an independently moveable facility where one desires to operate the facility as close to the oil sand mine face as possible. In such a case, the only stream requiring major transport comprises the bitumen froth stream 114 exiting from the cyclone separation facility, with tailings optionally deposited or stored close to the mine face. The cyclone separation facility removes the bulk of the solids from the ore slurry 100 at or close to the oil sand mining site thereby minimizing the need for transporting such material and the various costs associated therewith. Movement of the cyclone separation facility 102 may be accomplished by a mobile crawler (such as, for example, those manufactured by Lampson International LLC) or by providing driven tracks on the platform(s) supporting the separation stages. Various other apparatus or devices will be apparent to persons skilled in the art for achieving the required mobility.

Figure 2:
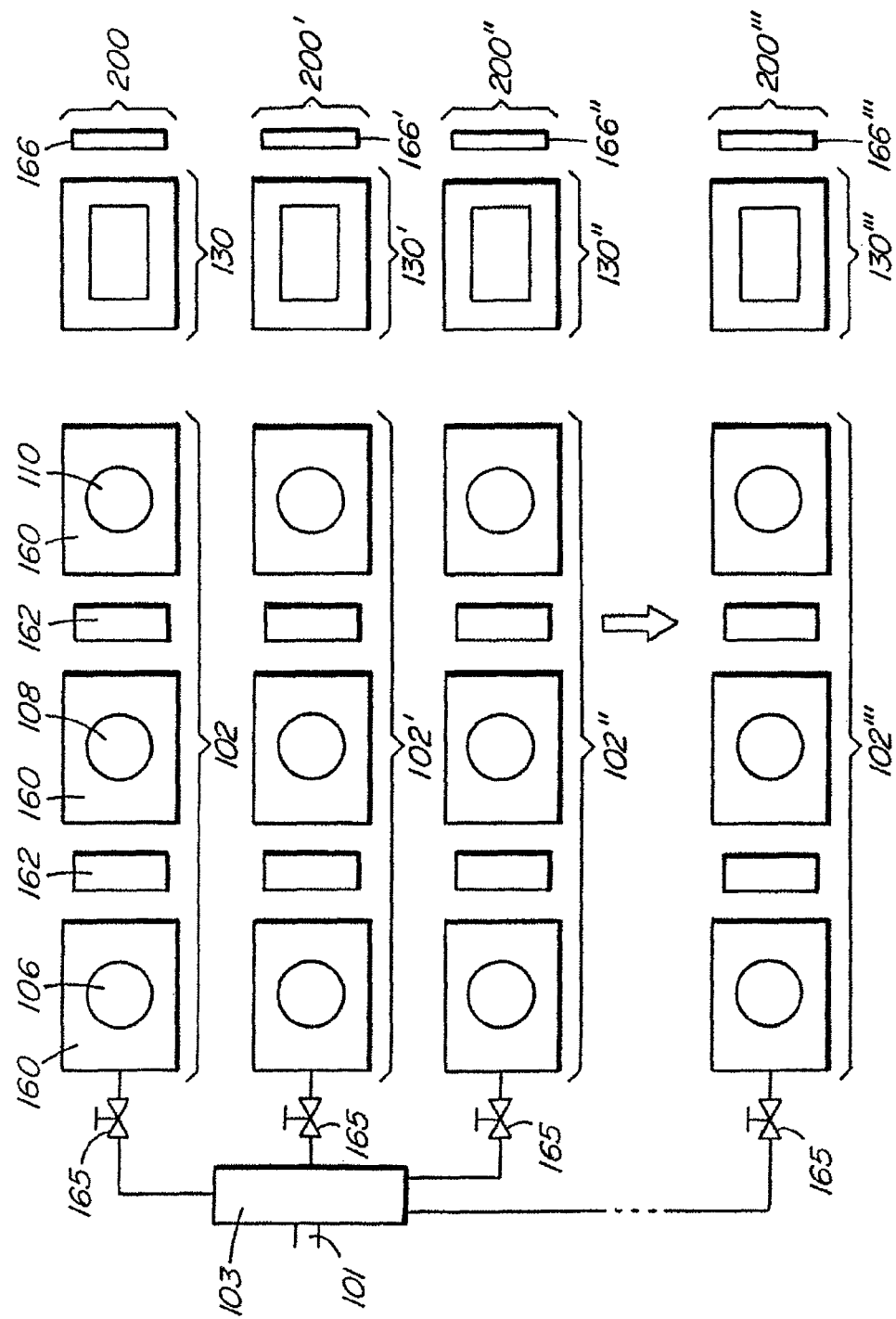
FIG. 2 is a schematic view showing a modular, mobile extraction system according to an aspect of the present invention incorporating a plurality of mobile cyclone separation stages forming a mobile cyclone separation facility and a mobile froth concentrator vessel defining a mobile froth concentration facility.

By way of example, FIG. 2 shows a setup according to an aspect of the invention in which each cyclone separation stage 106, 108 and 110 is mounted on its own independent skid 160 to form a mobile module. Positioned between each cyclone separation stage skid 160 is a separate pump skid 162 which provides appropriate pumping power and lines to move the froth streams and solid tailings streams between the cyclone separation stages. It is also possible that any pumping equipment or other ancillary equipment can be accommodated on skid 160 with the cyclone separation stage. In the illustrated arrangement of FIG. 2, groups of three mobile modules are combinable together to form cyclone separation facilities 102, 102', 102'' to 102''' as needed. Also associated with each cyclone separation facility is a mobile froth concentration facility 130 which will be described in more detail below.

Each cyclone separation facility and associated froth concentration facility in combination define the smallest effective working unit 200 of the extraction system according to the illustrated embodiment. This modular arrangement of the extraction system provides for both mobility of the system and flexibility in efficiently handling of different volumes of ore slurry. For example, mobile modules comprising skids or other movable platforms with appropriate cyclone stage or froth concentration equipment on board may be assembled as needed to create additional mobile extraction systems 200', 200'' to 200''' to deal with increasing ore slurry flows provided by hydro-transport line 101. Ore slurry from the transport line 101 is fed to a manifold 103 which distributes the slurry to a series of master control valves 165. Control valves 165 control the flow of ore slurry to each mobile extraction system 200 to 200g. This arrangement also permits extraction systems to be readily taken off-line for maintenance by switching flow temporarily to other systems.

It will be apparent to persons skilled in the art that other arrangements of the cyclone separation facility and the froth concentration facility are possible to enhance the mobility of the combined system. In an alternative arrangement, the cyclone separation facility 102, the froth concentration facility 130, and associated auxiliary equipment for pumping may all be positioned on a common skid such that a single skid operates as the smallest effective working unit of the extraction system. Due to the volumes of water re-circulated in the extraction process, a single skid supporting facilities in close proximity as an independent working unit can provide significant cost advantages. The skid may also include the water recover unit 140 (discussed in more detail below).

The separation efficiency of the multi-stage counter-current cyclone separation facility allows the extraction system to be used with a variety of ores having different bitumen contents and solids contents. In the case of solids contents, both the mineral components and the fines components including silts and clays can vary. As will be discussed below, it is possible for the cyclone separation facility to operate with a single cyclone separation stage or a pair of cyclone separation stages depending on the ore content, however, the three stage counter-current arrangement is the preferred arrangement for efficient separation over the widest range of ore grades.

The system and process contemplated herein are not limited to the three stage countercurrent cyclone separation facility 102 illustrated, by way of example, in FIG. 1A. The number of cyclone stages in the cyclone separation facility 102 are primarily influenced by economics including such factors as the trade-off between equipment costs and the value of the recovered product.

Figure 1B:
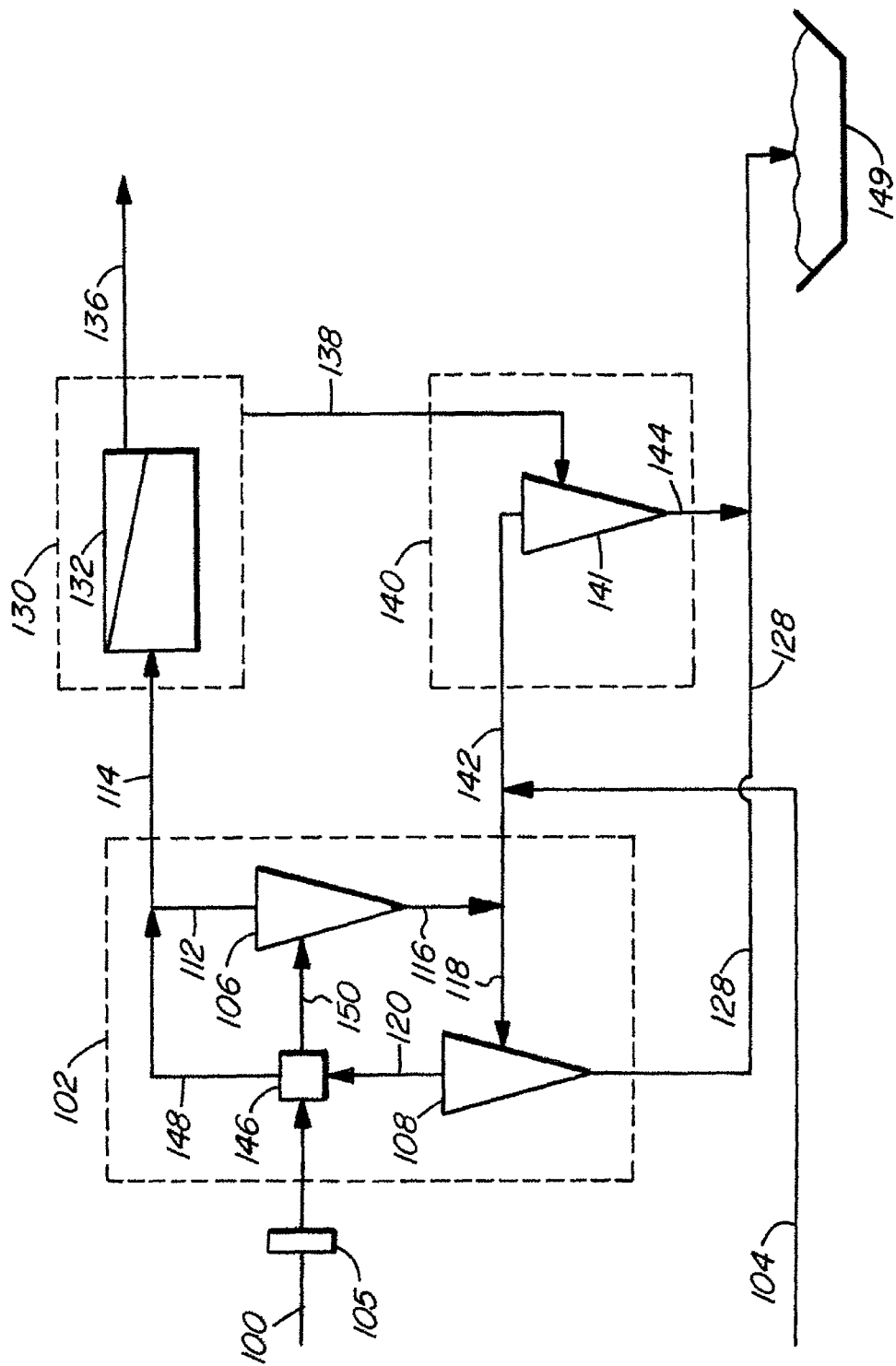
FIG. 1B is a flow diagram showing an alternative embodiment of the system which employs a cyclone separation facility having two cyclone stages.

By way of further example, FIG. 1B shows an alternative embodiment of a system for extracting bitumen having a cyclone separation facility 102 that includes two cyclone separation stages 106 and 108 that are connected in a counter-current arrangement. The cyclone separation stages each comprise one or more hydrocyclones that are generally vertical units, which have a minimal footprint, thereby occupying a minimal area. In further alternative embodiments, cyclone installation may provide for mounting the cyclones on an angle. This may reduce the height used for installation and/or support and may direct the underflow streams to a common pumpbox. This may provide for reduced costs associated with the use of launders. This can be particularly desirable in relation to those embodiments of the present invention which are directed to a mobile cyclone separation facility.

In the facility of FIG. 1B, the slurry 100 (including the bitumen and solid components of the ore) is fed to the first cyclone separation stage 106 wherein a first separation of the bitumen froth and solids is conducted as described above. Optionally, the slurry 100 is processed by a screening and/or comminuting unit 105 before entering the first cyclone separation stage 106 to ensure that solid particles in the slurry can be handled by the cyclone. Rejected solid particles can either be discarded after screening or made smaller by crushing or other suitable techniques. In the first cyclone separation stage 106, slurry 100 is processed in the manner described above to produce a first bitumen froth 112, and a first solid tailings stream 116 which comprises significantly less bitumen and substantially more solids than found in the first bitumen froth 112. Bitumen froth 112 is delivered to a froth collection stream 114, while first solid tailings stream 116 may be diluted with wash water 104 and pumped to a feed stream 118 of the second cyclone separation stage 108 where a further cyclone separation process is conducted.

The bitumen froth 120 produced by the second cyclone separation stage 108 is reintroduced to the feed stream 100 supplying the first separation stage 106. The tailings stream 128 from the second cyclone separation stage 108 may be optionally mixed with fine tailing stream 144 and pumped to a disposal site such as a tailing pond 149. The tailings streams tend to be high density streams that are challenging to pump on a sustained basis. The addition of fine tailings stream 144 improves the pumpability of tailings stream 128. It will be noted that many of the alternative embodiments as described herein with respect to the illustrated embodiments of FIG. 1A may also be applied to the illustrated embodiments of FIG. 1B.

Figure 1C:
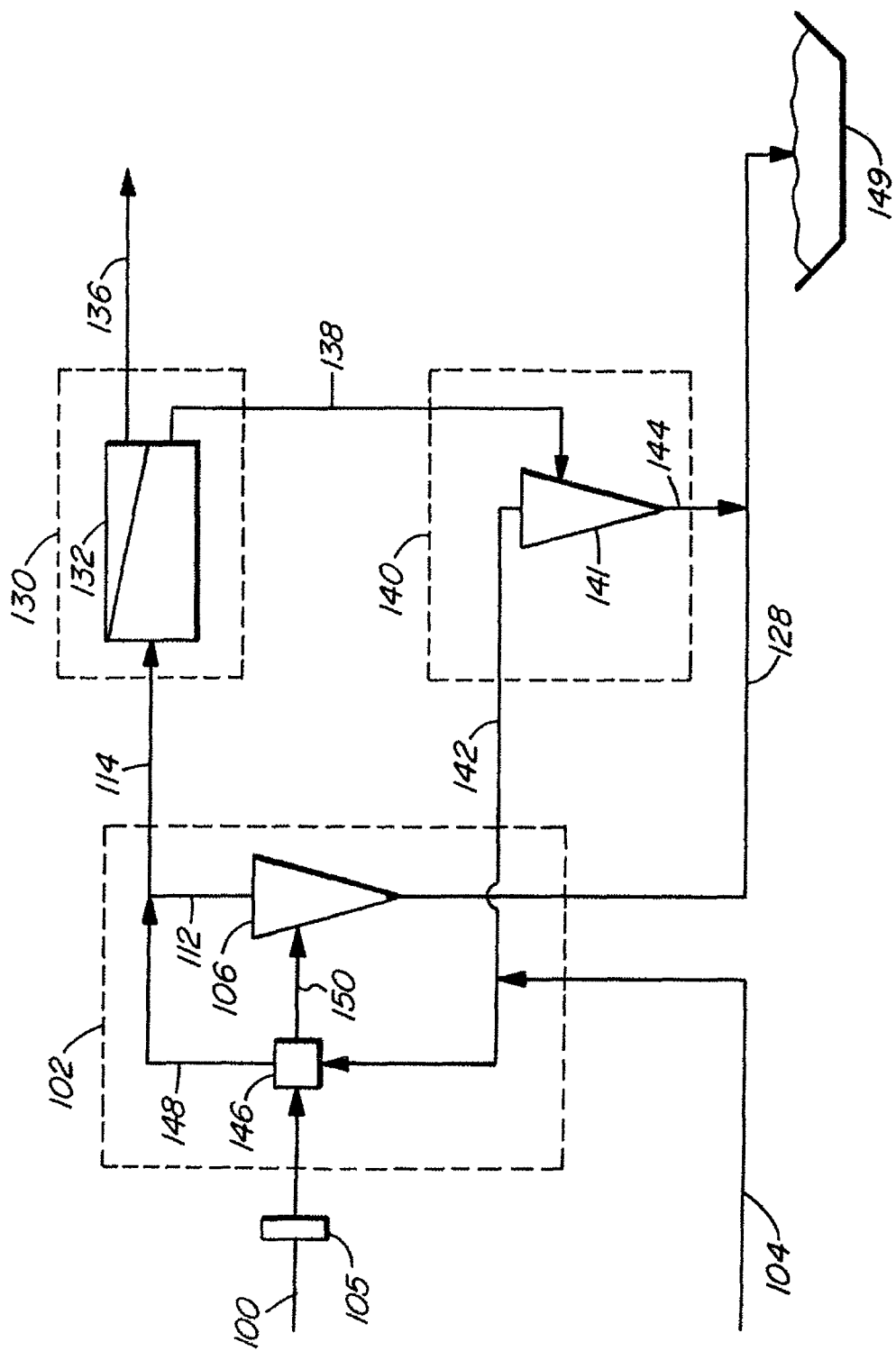
FIG. 1C is a flow diagram showing a further alternative embodiment of the system which employs a cyclone separation facility having a single cyclone stage.

A system for extracting bitumen that incorporates a cyclone separation facility 102 that makes use of a single cyclone stage is also possible, and is specifically illustrated in FIG. 1C. In FIG. 1C, the same features as described in previous embodiments are labeled with the same reference number. In this embodiment, the single cyclone stage 106 precludes the use of countercurrent flow between different stages. As in previously described embodiments, the slurry 100 is processed by a screening and/or comminuting unit 105 before entering the single cyclone separation stage 106 as feed 150 to ensure that solid particles in the slurry can be handled by the cyclone. The single cyclone stage produces bitumen froth 112 and solid tailings stream 128 which comprises significantly less bitumen and substantially more solids than found in bitumen froth 112. Bitumen froth 112 is delivered to a diluted froth collection stream 114, while solid tailings stream 128 may be optionally mixed with fine tailing stream 144, and directed to tailings disposal site 149. The single stage facility still makes use of wash water 104 and recycled water 142 to dilute the slurry entering the cyclone stage 106.

The diluted bitumen froth stream 114 obtained from the de-mineralizing cyclone separation facility 102 is unique in that it contains a higher water concentration than normally results in other separation facilities. In this regard, the present system creates a bitumen froth stream 114 (a bitumen-lean froth stream) that is more dilute than heretofore known. In known separation facilities, the resulting bitumen enriched stream typically has a bitumen content of about 60% by weight, a solids content of approximately 10% by weight, and a water content of approximately 30% by weight. With the system and process according to an aspect of the present invention, however, sufficient water is added as wash water 104 to create a bitumen froth stream 114 having a bitumen content in the range of about 5-12% by weight, a solids content in the range of about 10-15% by weight and a water content of about 60-95% by weight. It will be understood that when the water content is in the higher concentrations (above about 85% by weight) the bitumen content and solids content may be below about 5% and 10% by weight, respectively. It will also be understood that the above concentrations are provided solely for illustrative purposes in one aspect of the present invention, and that in other variations various other concentrations will or can be achieved depending on various process parameters.

The present system and process create a diluted bitumen froth stream 114 as a result of washing the froth stream with water stream 104 and/or recycled water 142 in order to improve bitumen recovery. The washing assists in the removal of solids in slurry 100. However, the increased water content of bitumen froth stream 114 necessitates that the bitumen froth stream be further processed in an additional step through a froth concentration facility 130 in order to remove the wash water. This ensures that the final bitumen enriched froth stream 136 of the present system is of a composition that can be delivered to a conventional froth treatment facility (not shown) which operates to increase the bitumen concentration of the product to make it ready for further processing in an upgrade or refinery facility.

Referring to FIGS. 1, 1B and 1C, the bitumen froth stream 114 produced by the cyclone separation facility 102 is delivered to a froth concentration facility generally indicated at 130. More specifically, the froth stream 114 is preferably pumped to a froth concentrator vessel 132 within the froth concentration facility 130. Froth concentrator vessel 132 may comprise a flotation column, a horizontal decanter, a conventional separation cell, an inclined plate separator (IPS) or other similar device or system as will be known to persons skilled in the art. In one preferred embodiment, the froth concentration facility comprises at least one IPS unit. It will also be appreciated that the froth concentration facility 130 may comprise any number or combination of units. For example, in one embodiment, froth concentration facility 130 may comprise a separation cell and a flotation column arranged in series. In another embodiment, the froth concentration facility may comprise an IPS in association with a high rate thickener. In addition to the bitumen froth stream 114, an air feed 134 may also be pumped into the froth concentrator vessel 132 to assist in the froth concentration process. In general, however, sufficient air is entrained in the ore slurry during the hydro-transport process and in the froth stream during the cyclone separation step that addition of air is not warranted at the froth concentration step.

The froth concentrator vessels 132 described above tend to be suited to a froth concentration facility 130 according to an aspect of the invention that is intended to be fixed in place. This equipment does not tend to lend itself to being mobile when in operation due to its large size.

Within concentrator vessels 132, the froth is concentrated resulting in a final bitumen enriched froth or product stream 136 that may optionally be transported to a conventional froth treatment facility (not shown) to increase the bitumen concentration of the product to make it ready for further processing in an upgrader or refinery facility. The froth concentration facility 130 produces a fine solids stream 138 that comprises water and the fine solids (silt and clay) that were not separated at the cyclone separation facility 102. In one embodiment, chemical additives, injected air or other gases may also by used in the froth concentration facility 130 to enhance the separation of fine solids from the water.

The bitumen froth stream 114 that leaves the cyclone separation facility 102 contains bitumen at a concentration of about 5-12% by weight. As described above, this is a lean bitumen froth stream with a high water content. The froth concentration facility 130 is employed to increase the bitumen concentration in the final bitumen enriched froth stream 136 to about 55% to 72% by weight. When this final product of the extraction system is transported to a froth treatment facility (as mentioned above), the hydrocarbon concentration may be further increased to range from about 95% to 98% by weight. It should be noted that these concentrations are recited to exemplify the concentration process and are not meant to limit in any way the scope of any aspects of the present invention. It will be appreciated, for example, that the specific concentrations that can be achieved will depend on various factors such as the grade of the ore, the initial bitumen concentration, process conditions (i.e. temperature, flow rate etc.) and others.

In one aspect of the present invention, the froth concentration facility 130 is a mobile facility that is used in combination with the mobile cyclone separation facility 102 described above. As shown in FIG. 2, a froth concentration facility 130, 130', 130" to 130''' is included in each mobile extraction systems 200', 200" to 200''', respectively, to provide the necessary bitumen froth concentration step.

In order to meet the mobility arrangement for the froth concentration facility 130, a concentrator vessel specially designed for compactness may be used with the above-described extraction system. The preferred concentrator vessel for operation in a mobile facility is a modified version of a horizontal decanter. The modified design functions to efficiently process the lean bitumen froth stream exiting from the cyclone separation facility 102. The use of cyclone separation stages in the above described cyclone separation facility 102 allows the majority of the solids material (i.e. the mineral component) in the slurry to be removed. Such material is known to result in plugging of a device such as a horizontal decanter. However, since such material is removed by the cyclone separation facility, use of a horizontal decanter design is possible in the current system. As well, the horizontal decanter design lends itself well to modification to minimize the footprint of the concentrator vessel. This results in a preferred concentrator vessel having a configuration that is compact and readily movable, and therefore suited for incorporation into mobile embodiments of the present invention as described above and as illustrated schematically in FIG. 2.

Referring to FIGS. 3 to 8C, there are shown various embodiments of a froth concentrator vessel 132. Vessels according to this design have been found to reliably handle and process froth streams with a water content ranging from about 60-95% by weight, and with the majority of the solids content being fine solids with less than about 30% of the solids being of a particle size above about 44 microns. Such a froth stream composition is an example of a typical froth stream composition produced by cyclone separation facility 102 described above. However, the concentrator vessel 132 is not limited to handling froth streams with the above composition.

The preferred concentrator vessel 132 has a basic structure, however, the dimensions and proportions of the various regions of the vessel can vary. Vessel 132 includes an inlet region to receive and distribute the bitumen froth stream as a substantially balanced flow across a separation region. The separation region is adapted to establish uniform, substantially horizontal flow of the bitumen froth stream which serves to promote separation of the bitumen froth from the water and fine solids. The substantially horizontal flow allows the bitumen froth to move generally upwardly due to its lower density to accumulate as a froth layer atop a water layer without vector components due to flow that work against the upward movement. Similarly, the fine solids settle within the water layer due to their higher density. A froth recovery region is provided in communication with the separation region with an overflow outlet to collect the accumulated bitumen froth layer. There is also an underflow outlet to collect the water and fine solids as a combined material stream or as separate material streams. A flow level control device, preferably in the form of an overflow weir is used to control the level of the water layer within the vessel to permit the overflow outlet to collect the bitumen froth layer despite variations in the volume of the bitumen froth stream.

Figure 3:
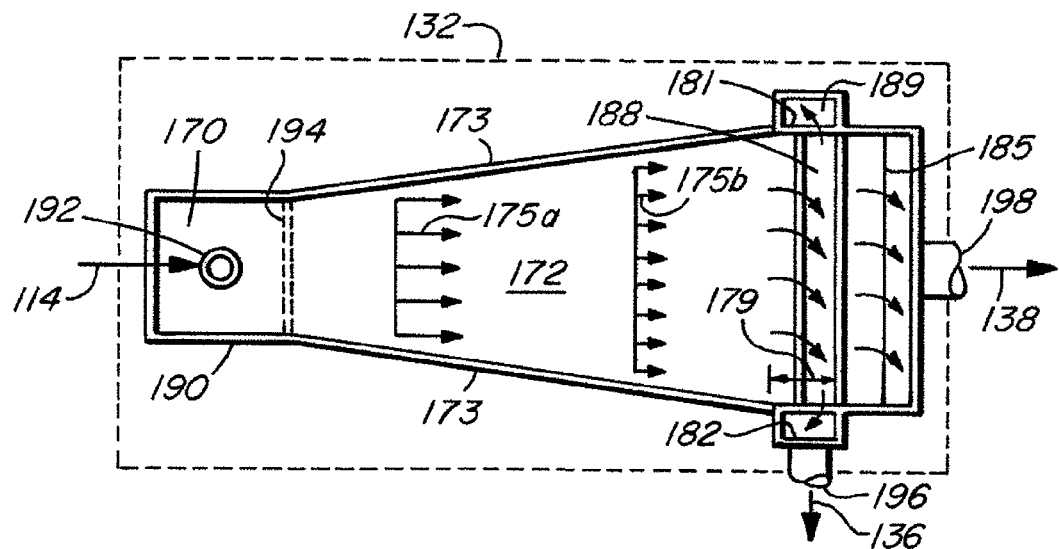
FIG. 3 is a top plan schematic view showing an embodiment of a froth concentrator vessel.
Figure 4:
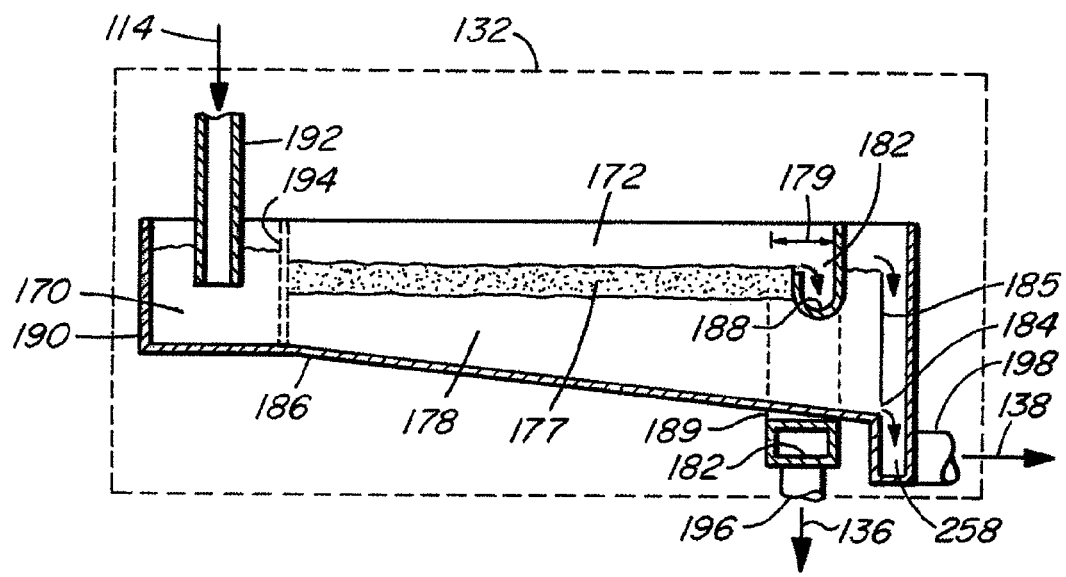
FIG. 4 is side elevation view of the concentrator vessel of FIG. 3.

FIGS. 3 and 4 are a schematic plan view and a side elevation view, respectively, of a concentrator vessel 132 showing the major features discussed above arranged in an exemplary configuration to permit an understanding of the overall operation of the unit. The vessel includes an inlet region 170 to receive the bitumen froth stream 114 from cyclone separation facility 102. Inlet region 170 communicates with a separation region 172 where bitumen froth is concentrated by separation from the water and fine solids of the froth stream 114. In this case, separation region 172 comprises a diverging channel which serves to establish uniform, substantially horizontal flow of the bitumen froth stream. The diverging channel also functions to slow the flow of the bitumen froth stream 114. Uniform, substantially horizontal flow and slower flow promote vertical separation of the bitumen froth from the water and the fine solids due to gravity. As best shown in FIG. 3, the diverging walls 173 of the channel result in the velocity of the flow through the channel slowing due to there being an increasing area (wider channel) for the flow to move through. Arrows 175a show an initial velocity of flow volume through the channel at a time $t_1$ while arrows 175b show a slower flow velocity at a later time $t_2$ in a wider portion of the channel. In other words, the volumetric flow rate Q through the channel stays constant, however, the velocity slows as the area available for flow increases. As flow moves through the channel, gravity and the slowing of the flow causes bitumen froth to accumulate as an upper froth layer 177 atop a lower water layer 178 with fine solids settling within the water layer. This is best shown in the side elevation view of FIG. 4. The bitumen froth will tend to coalesce and float on the surface of what is primarily an aqueous flow (about 85-90% water by weight) and any remaining fine solids (silt and clay) in the stream will tend to settle within the water layer. The diverging channel of separation region 172 ends in a froth recovery region 179 which is formed with an overflow outlet 182 to collect the bitumen froth layer as a final bitumen froth stream 136. An underflow outlet 184 collects the water and fine solids stream 138.

In the illustrated embodiment of FIGS. 3 and 4, overflow outlet 182 comprises at least one weir formed across the froth recovery region 179. The weir may be a conventional crested weir or a weir 188 having a J-shaped cross-section (as best shown in FIG. 4). Overflow outlet 182 is formed as a continuous weir about the perimeter or a portion of the perimeter of the froth recovery region 179. Alternatively, overflow outlet 182 can comprise a plurality of crested weir or J-weir sections in the perimeter wall 181 of the froth recovery region 179. The number and positioning of the weirs about the perimeter of froth recovery region 179 will affect the volumetric flow through the concentrator vessel. Any overflow outlet 182 formed in froth recovery region 179 communicates with a froth launder 189. In the embodiment of FIGS. 3 and 4, the launder 189 extends downwardly and under the vessel to collect the weir overflow and deliver the final bitumen enriched froth stream 136 to a product nozzle 196. The launder may also extend about the perimeter of the froth recovery region.

A flow level control device in the form of an end weir 185 is provided adjacent the froth recovery region to control the level of the water layer 178 within the vessel. In the illustrated embodiment, end weir 185 is an overflow weir. Use of end weir 185 controls the level of the water layer 178 to permit the overflow outlet 182 to collect the bitumen froth layer 177 despite variations in the volume of the bitumen froth stream. Downstream of end weir 185, water and a fine solids stream 138 flow to an underflow outlet 198 in the form of an outflow nozzle. Opening 184 in end weir 185 is provided to allow for passage of fine solids past the weir.

The flow level control device may be a pump or a valve arrangement to control the level of water layer 178 within the concentrator vessel, however, an end weir 185 provides for the simplest and most reliable control of the water level. To accommodate a wide range of flows, weir 185 is preferably configured as a serpentine weir to increase length within the vessel.

As best shown in FIG. 4, the floor 186 of at least the separation region 172 and the froth recovery region 179 are inclined to promote flow through the concentrator vessel and to prevent fine solids from accumulating within the vessel.

FIG. 4 also shows a preferred arrangement for inlet region 170. The inlet region preferably includes conditioning means in the form of an enclosure 190 about an inlet pipe 192 for bitumen froth stream 114. The enclosure and inlet pipe are provided to promote a uniform velocity flow of the froth stream as the stream enters the separation region. Enclosure 190 and inlet pipe 192 serve to isolate the bitumen froth stream 114 entering the vessel at the inlet region 170 from the separation region 172 to avoid generation of turbulence in the separation region. The bitumen froth stream exits enclosure 190 through a baffle plate 194 which assists in the establishment of substantially uniform velocity flow within the diverging channel.

Figure 5:
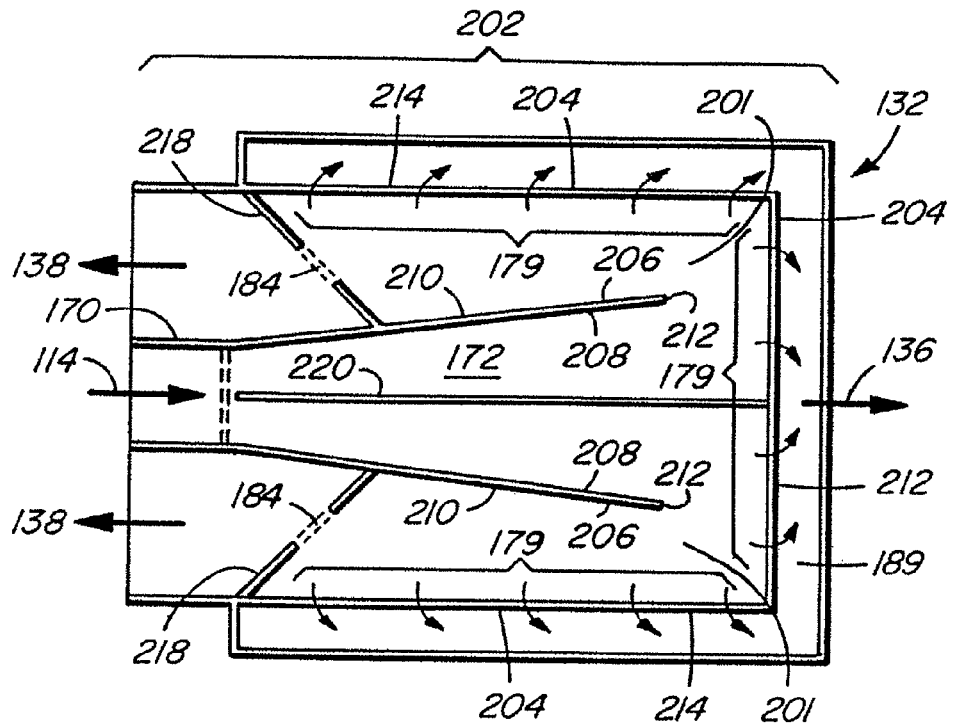
FIG. 5 is a top plan schematic view showing an alternative concentrator vessel incorporating a turn in the diverging channel.

FIG. 5 shows schematically in plan view an alternative embodiment of a concentrator vessel 132 for use with various embodiments of the system of the present invention. In FIG. 5, features that are common to the vessel of FIGS. 3 and 4 are labeled with the same reference number. The concentrator vessel of FIG. 5 differs from the vessel of FIGS. 3 and 4 primarily by virtue of the fact that the diverging channel defining the separation region 172 is formed with at least one turn 201 to increase the length of the channel and the region available for formation of the froth layer and settling of the fine solids material. Turn 201 may also serve to shorten the overall length dimension 202 of the concentrator vessel 132 to make the vessel more compact and suitable for a mobile role.

In the concentrator vessel embodiment of FIG. 5, there is an outer perimeter wall 204 and a floor which define a flow volume into which lean bitumen froth stream 114 is introduced after passing through inlet region 170. Diverging channel 172 is formed by at least one barrier within the outer perimeter wall. In the illustrated embodiment, the at least one barrier comprises a pair of diverging plates 206 that define a first section of the diverging channel 172 between opposed inner surfaces 208 of the plates, and a second section of the diverging channel after turn 201 between the outer surfaces 210 of the plates and the perimeter wall 204 of vessel. Turn 201 is formed between the ends 212 of the plates and the outer perimeter wall. In the embodiment of FIG. 5, the froth recovery region 179 is adjacent the outer perimeter wall of the flow volume. The pair of diverging plates 206 are positioned centrally adjacent inlet region 170 to form a central diverging channel which divides into two channels at turns 201 on opposite sides of the flow volume. At turn 201, flow from the first section of diverging channel 172 is split into two separate flows with each flow reversing course through substantially 180 degrees toward inlet region 170 in the second section of the diverging channels. This reversing of the flow at each turn 201 requires slowing and turning of the flow which provides additional opportunity for the bitumen froth layer to form on the water layer of the flow. End wall section 212 of perimeter wall 204 where the flow reverses tends to create a stagnant zone defining a portion of the froth recovery region for the present vessel for removal of the accumulated bitumen froth layer. End wall section 212 is therefore formed with an overflow outlet in the form of an overflow weir that empties into launder 189 for collection and recovery of the separated froth. Side wall sections 214 of the perimeter wall define additional froth recovery regions. One or more additional overflow outlets for bitumen froth into launder 189 may be formed in side wall sections 214. The overflow outlets of the side wall or end wall sections may be the crest weir or J-weir arrangements previously described in the discussion of FIG. 4 or a combination of both. The use of end wall section 212 and side wall sections 214 to provide overflow outlets for the enriched bitumen froth provides an opportunity to collect the bitumen enriched froth product in stages so that the product is recovered as it is produced. This minimizes "slip" between the froth layer and the underlying water layer which is important to avoid bitumen being entrained back into the water layer. The enriched bitumen froth collected in launder 189 exits from the launder as final product stream 136. An overflow weir 218 is formed at the downstream end of each channel of the vessel to control the level of the water layer in the vessel as described above with respect to the embodiment of FIGS. 3 and 4. Overflow weirs 218 communicate with an underflow outlet to receive the water and fine solids stream 138.

The concentrator vessel 132 of FIG. 5 may also include an inclined floor formed in the separation region and the froth recovery region to induce flow from the inlet region to the overflow and underflow outlets. The inclined floor of the flow chamber provides a path for collection of rejected water and fine solids and enhances removal of these components without re-entrainment of the bitumen froth layer. The inclined floors also permit transport of settling solids through port 184 in overflow weir 218. The combined water and fine solids stream which passes overflow weir 218 leaves the vessel as stream 138 via an underflow outlet.

The concentrator vessel 132 of FIG. 5 optionally includes a central barrier 220 extending between the pair of diverging barriers 208 to form a pair of diverging channels adjacent the inlet region.

Figure 6:
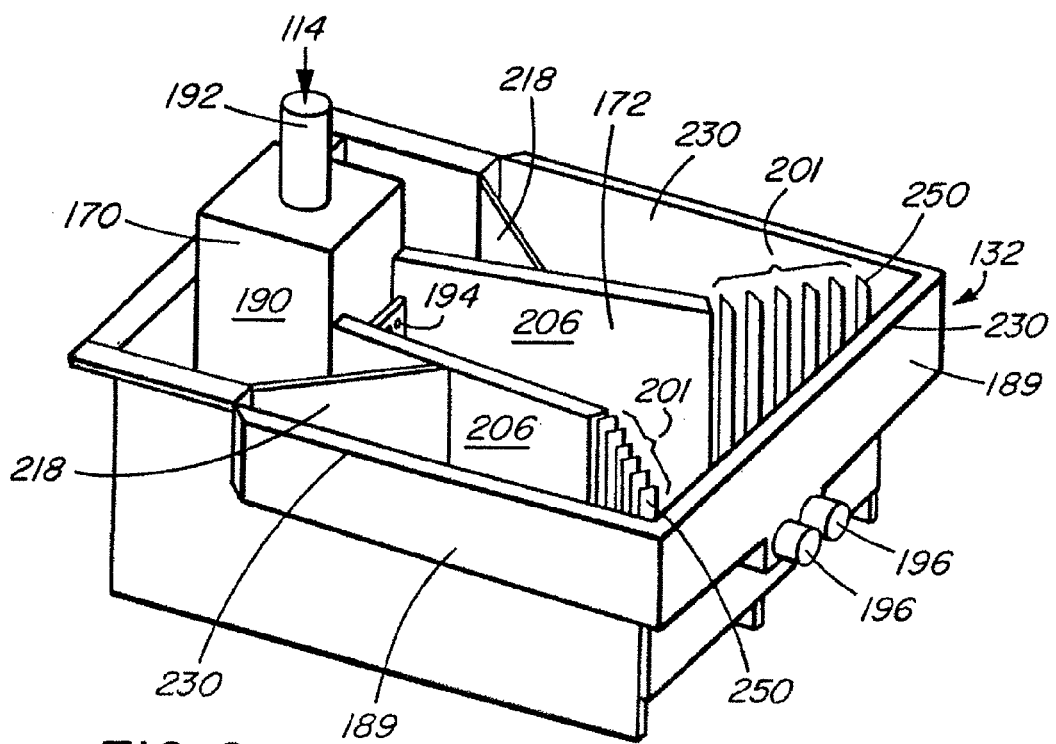
FIG. 6 is a perspective view of a concentrator vessel according to another embodiment.
Figure 7:
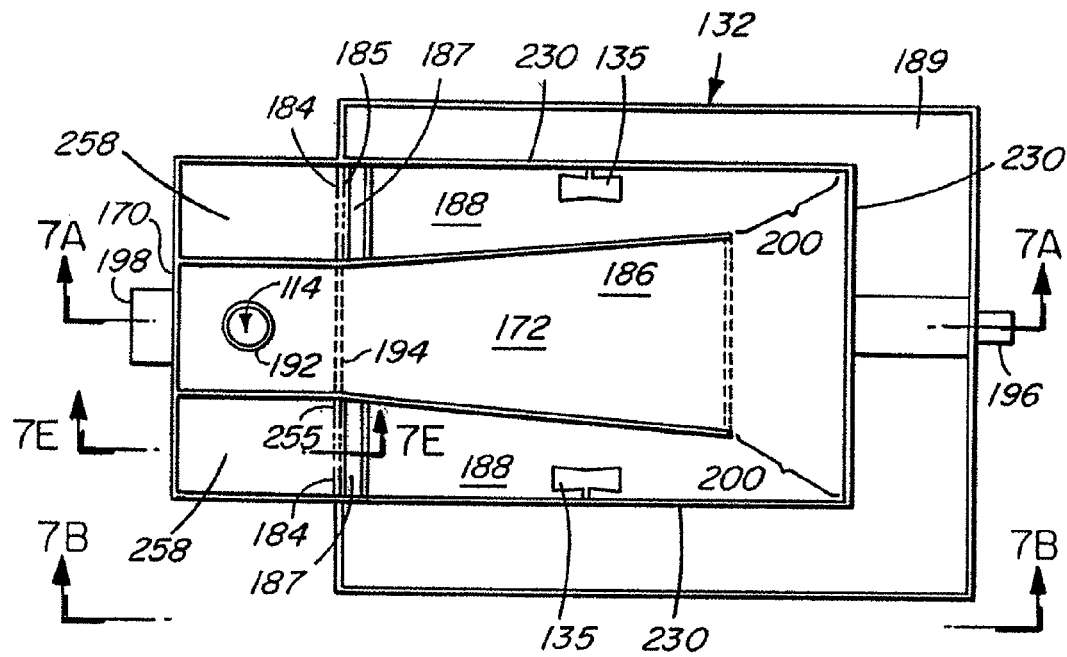
FIG. 7 is a top plan view of a concentrator vessel according to a further embodiment.
Figure 7E:
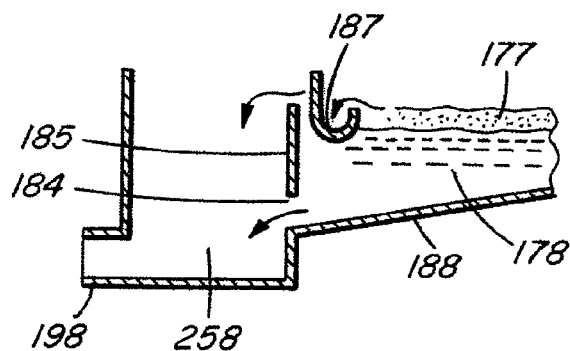

FIGS. 6 to 7E show perspective and orthographic views of further embodiments of concentrator vessels constructed according to the design principles discussed above.

Figure 7A:
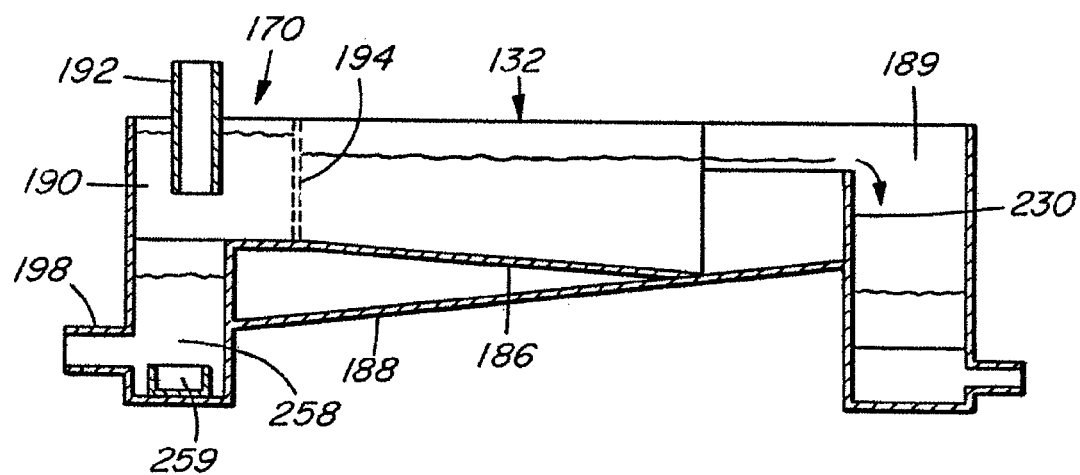
FIG. 7A is a cross-sectional elevation view taken along line 7A-7A of FIG. 7.

In each embodiment, inlet region 170 is formed with an enclosure 190 and baffle plate 194 to prevent turbulent flow created when bitumen froth stream 114 is delivered into the inlet region by inlet pipe 192 from disturbing the flow in diverging channel 172. Flow exits the inlet region through baffle plate 194 which tends to assist in establishment of substantially uniform velocity flow within the diverging channel 172 of the separation region. As best shown in FIG. 7A, which is a cross-sectional view taken along line 7A-7A of FIG. 7, and FIG. 7B, which is a side elevation view taken along line 7B-7B of FIG. 7, the floor 186 of diverging channel 172 defining the first separation region before turn 201 and the floor 188 of the second separation region after turn 201 are sloped to promote flow through the concentrator vessel and to ensure that fine solids that settle in the water layer continue to be transported along the sloped floor by gravity towards the underflow outlets 184. By way of example, floors 186 and 188 may have a slope of about 3-3.5%, but other inclines are also possible.

Figure 7B:
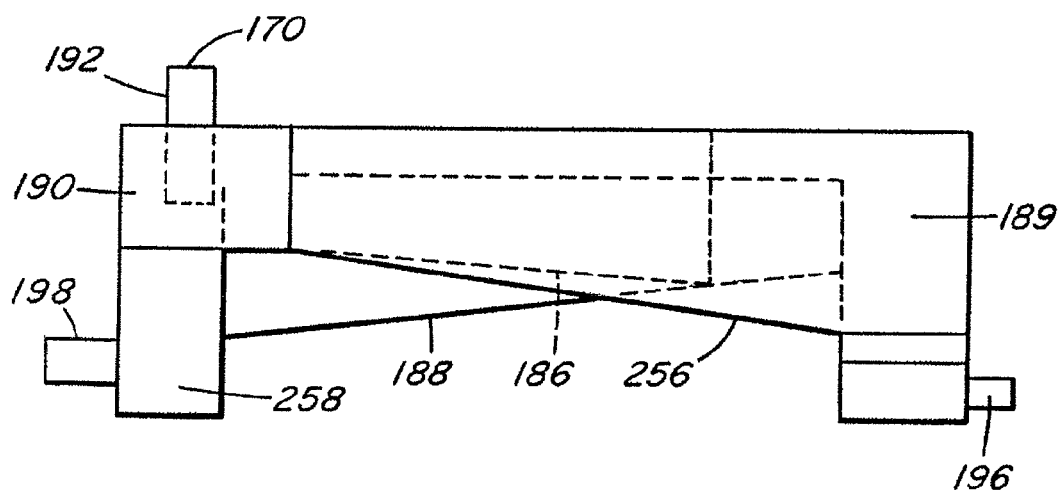
FIG. 7B is a side elevation view taken along line 7B-7B of FIG. 7.
Figure 7C:
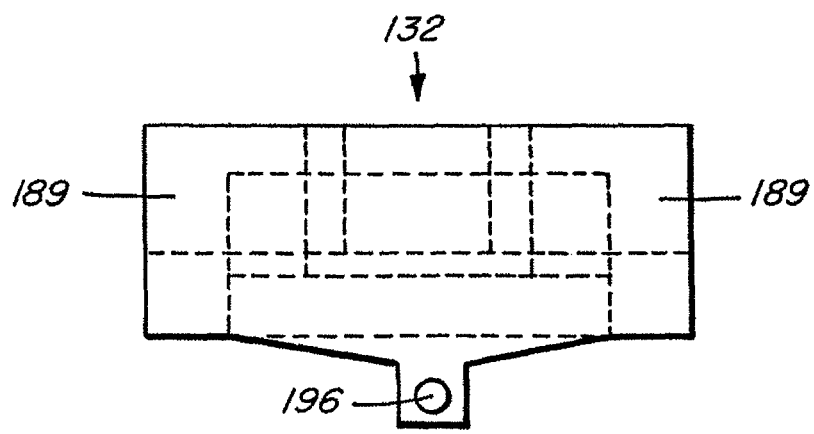
FIG. 7C is an end view of the concentrator vessel of FIG. 7 showing the overflow outlet end and the bitumen froth exit nozzle.

Adjacent perimeter walls 230 is the froth recovery region of the concentrator vessels. Perimeter walls 230 are formed with overflow outlets in the form of crested weirs or J weirs to allow the bitumen enriched froth layer collecting atop the water layer to overflow from the concentrator vessel into froth launder 189. As best shown in FIG. 7B, froth launder 189 is formed with a sloped floor 256 that delivers the collected bitumen enriched froth to one or more product nozzles 196. FIG. 7C, which is an end view of the concentrator vessel, shows product nozzle 196 at a low point in the launder to ensure efficient collection of the bitumen enriched froth stream.

Figure 7D:
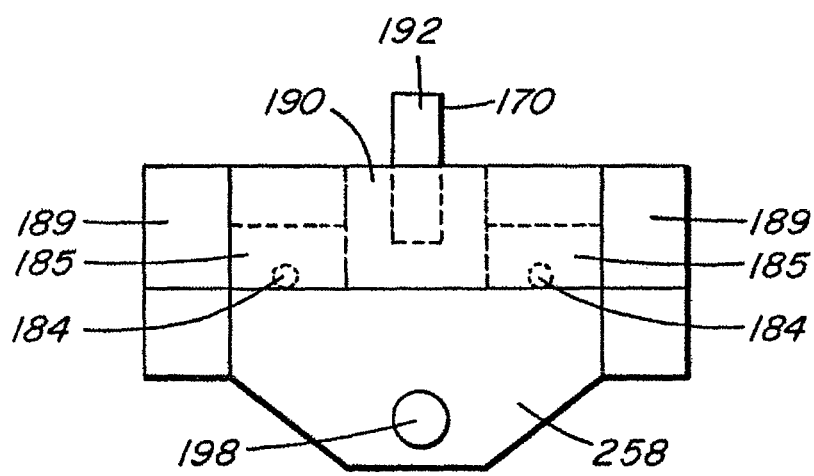
FIG. 7D is an opposite end view of the concentrator vessel of FIG. 7 showing the underflow outlet end and the water and fine solids exit nozzle.

As best seen in FIGS. 7 and 7E (which is a section view taken along line 7E-7E of FIG. 7), at the opposite end of the concentrator vessel, the water and fine solids stream exits the concentrator vessel past flow level control devices in the form of overflow weirs 185. The water layer overflows each weir 185 and any fine solids collected on the floor of the vessel move past weir 185 through underflow outlets 184. A J-weir 187 in communication with froth launder 189 is preferably formed before each weir 185 to collect bitumen froth at the end of the discharge channel. The rejected water and fine solids stream is collected in a discharge section 258 and discharged through outflow nozzle 198. As best shown FIG. 7D, which is an end view of the concentrator vessel, the discharge section is formed with a sloped floor and outflow nozzle 198 is at a low point in discharge section. Discharge section 258 may include a removable solids clean out box 259 so that any fine solids that accumulate in the discharge section can be periodically removed.

As shown in the embodiment of FIG. 6, the concentrator vessel 132 may optionally include flow re-direction means in the form of vanes 250 to promote smooth flow through turns 201 in the diverging channels. Vanes 250 are adapted to re-direct the flow through turns 201 to maintain smooth flow lines and prevent mixing of the. Alternatively, the flow re-direction means may also comprise rounded corners formed in the outer perimeter wall of the flow volume to promote smooth, non-mixing flow through turns 201.

The concentrator vessel embodiment of FIG. 7 includes a froth layer flow enhancement means 135 to prevent formation of stagnant regions in the froth layer. In the illustrated embodiment, the froth layer flow enhancement means takes the form of a rotatable paddle element which is operated to urge the froth layer into movement in any stagnant zones that may develop so as to urge the froth layer toward an overflow outlet.

In the previous embodiments of the concentrator vessel discussed above, FIGS. 3 and 4 illustrate a "high aspect ratio" vessel in that separating region 172 is relatively long in length compared to the vessel width. FIGS. 5, 6 and 7 illustrate a "return flow vessel" in that the separation region 172 is similar in both length and width.

Figure 8B:
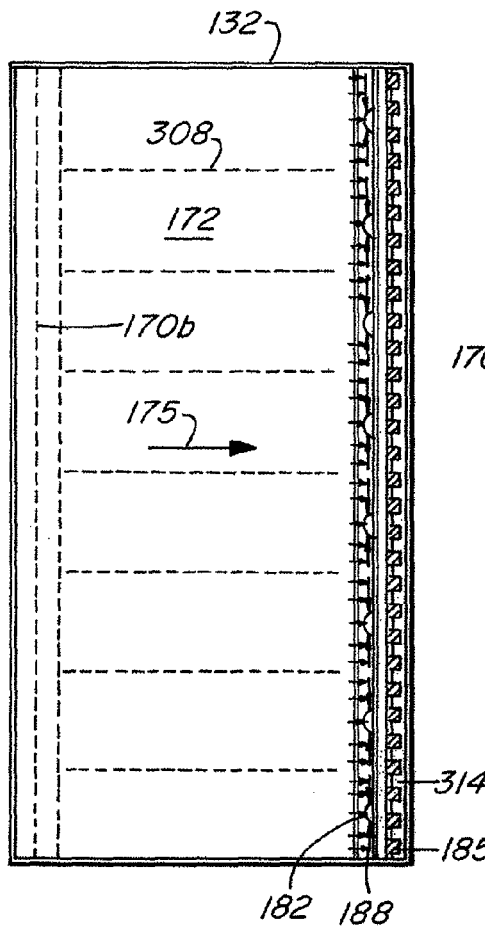
FIG. 8A-8C are schematic views of an alternative concentrator vessel according to a still further embodiment.
Figure 8A:
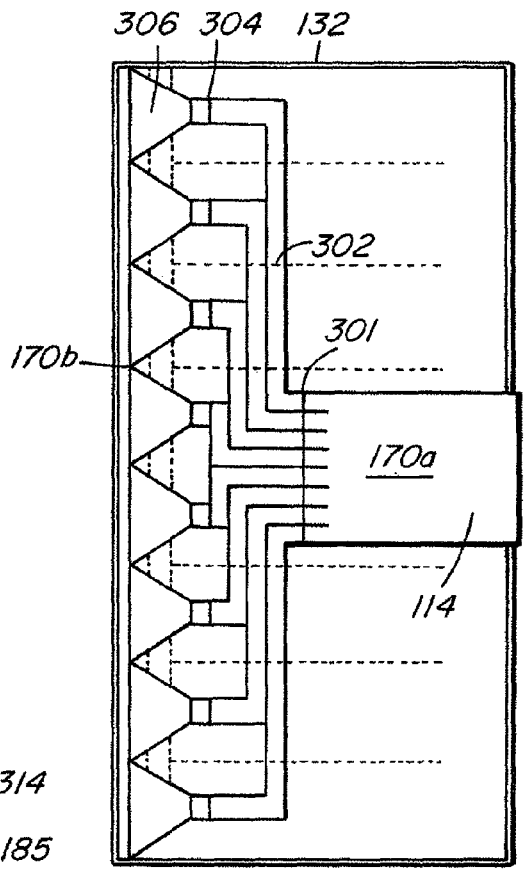
Figure 8C:
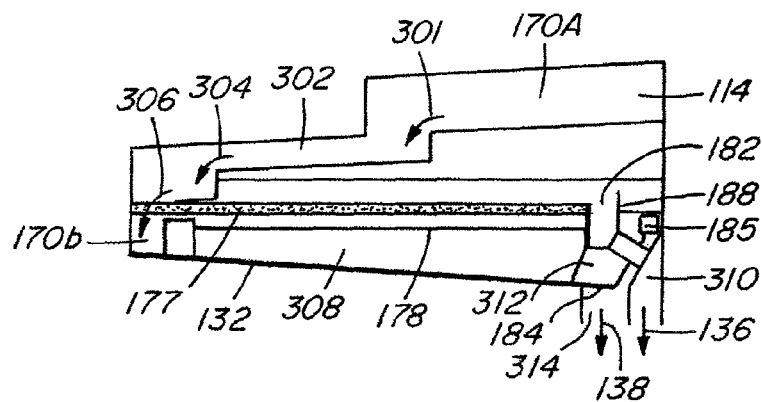

As a further example of the manner in which the concentrator vessel can be configured to suit specific layout requirements, FIGS. 8A-8C show an alternative vessel which is an example of a "low aspect ratio" vessel in that the flow stream of the separation region 172 is relatively wide compared to the length. This layout is particularly suited to a mobile bitumen extraction system.

Referring to FIGS. 8A-8C, a "low aspect ratio" froth concentration vessel 132 comprises an inlet region 170A to receive the bitumen froth stream 114 from the cyclone separation facility 102 via a gravity flow channel. As illustrated in FIG. 8a the inlet region 170A connects via system of splitters and distribution channels to distribute the bitumen froth stream 114 equally both in volumetric and composition across the length of the inlet region 170B. It will be noted that a first hydraulic jump 300, distribution channels 302, a second hydraulic jump 304 and fan distributors 306 illustrated in FIG. 8A are only examples of various devices and techniques available to persons skilled in the art for distributing the bitumen froth feed 114.

The inlet region 170B may incorporate perforated distribution plates to stabilize the incoming bitumen froth 114 into the separation region 172. As illustrated in FIG. 8b, the separation region 172 may be subdivided by parallel vertical baffles 308 such that the geometry for each flow channel is the same. The vertical baffles 308 result in channel Reynolds numbers of about 175,000 and turbulence intensities in the order of 25% from the mean flow.

In the separation zone 172, aerated bitumen droplets tend to move upwardly to float on the surface of a water layer 178. The droplets coalesce into a bitumen froth 177 which overflows by gravity into overflow outlet 182. The overflow outlet illustrated in FIGS. 8B and 8C are a plurality of J-weirs 188 configured to span the width of the froth concentration vessel 132. Each segment of the J-weir 188 collects bitumen froth 177 from a specific portion of the froth concentration vessel 132 and transfers the bitumen froth 177 into the froth collection launder 310 below the froth concentration vessel 132 as best shown in FIG. 8C. The bitumen froth collected in the froth collection launder 310 exists from the froth concentration vessel as final product stream 136. Other locations for the froth collection launder 310 may be applied to specific layout considerations.

The froth concentrator vessel 132 illustrated in FIG. 8C includes an inclined floor from the inlet region 170B to the underflow outlet region 312. The inclined floor slope may be in the range of from about 3 to 7% or in the range of about 3-3.5% in the direction of the flow stream and assists gravity in transferring settling fine solids to be discharged via the underflow outlet 184. Located at the low point of the separation region 172, the underflow outlet 184 is a slotted orifice spanning the width of the froth concentration vessel and discharges settled fine solids with a portion of the water into the underflow collection launder 314. Other apparatuses such as valves can be applied in lieu of the slotted orifice and/or the underflow outlet 184 can be segregated for subsequent water treatment operations.

The bulk of the water entering into the underflow region exits the froth concentration vessel 132 via an overflow weir 185. In order to control the water level upstream of the weir within the operational tolerances for the J-weir to collect bitumen froth, the overflow weir 185 illustrated in FIG. 8B may be a long crested or serpentine weir specified to limit the water level while permitting significant variations in the water flow rate due to feed fluctuations in the volume and composition of bitumen froth feed 114. The overflow weir 185 discharges into the underflow collection launder 314 and combines with the underflow outlet 184 discharge as the water and fine solids stream 138 from the froth concentrator vessel 132. Note in this arrangement that the water and fine solids streams are readily separable for handling in different downstream processes, if desired.

Referring back to FIG. 1A or 1B, in a further embodiment of the system of the present invention, the water and fine solids stream 138 produced by froth concentration facility 130 is diverted to an optional water recovery facility 140 which separates the fine solids stream 138 into a water stream 142 and a concentrated fine solids stream 144. The fine solids stream 144 is preferably combined with the solids stream 128 produced by the cyclone separation facility 102. As shown in FIG. 1A-1C, water stream 142 may be recycled into the water feed 104 that is supplied to the cyclone separation facility 102 to create a blended water stream. This serves to reduce the amount of new water required by the system by recycling and reusing water.

Water recovery facility 140 may include any known equipment 141 for separating water from solids such as, for example, a thickener or a cyclone stage. Preferably, water recovery equipment 141 is specifically designed to separate small sized solids particles (silt and clay) since much of the larger sized solid particles have been removed upstream in the cyclone separation facility 102. The most appropriate equipment for this step will often be a high gravity hydrocyclone unit. A suitable hydrocyclone for the water separation step is a 50 mm Mozley hydrocyclone as marketed by Natco. Removal of fine solids from water stream 142 avoids the accumulation of the such solids within the system and permits recycling of the water. Water recovery facility 140 is preferably mobile and may comprise a water recovery unit mounted on its own independently movable platform 166 (see FIG. 2) or incorporated into the same movable platform as froth concentration facility 130.

The slurry 100 that is fed to cyclone separation facility 102 is generally formed using heated water. In conventional bitumen extraction equipment such as primary separation vessels (PSV), where bubble attachment and flotation are used for bitumen extraction, temperature can affect the efficiency of the extraction process. In embodiments of the present invention, the extraction process is not as temperature sensitive since the cyclone equipment provides solid/liquid separation based on rotational effects and gravity. Extraction efficiency tends to be maintained even as temperature drops making the cyclone extraction process more amendable to lower temperature extraction. This has energy saving implications at the cyclone separation facility 102 where wash water feed 104 or recycled water stream 140 do not have to be heated to the same extent as would otherwise be necessary to maintain a higher process temperature.

In a further aspect of the present invention, as shown in FIG. 1A-1C, the cyclone separation stage 102 may optionally be provided with a "scalping" unit shown at 146. The scalping unit 146 may comprise, for example, a pump box or the like which serves to remove any froth formed in the slurry feed 100 during the hydro-transport process. It will be appreciated that removal of such bitumen rich froth further increases the recovery efficiency of the three-stage counter-current separation stages. The froth stream 148 generated by the scalping unit 146 is combined into the froth stream 114 resulting from the cyclone separation facility 102. The remaining slurry from the scalping unit 146 then comprises the feed 150 to the cyclone separation facility. As illustrated in FIG. 1A-1C, if a scalping unit 146 is used, the froth stream 120 from the second cyclone separation stage 108 is fed downstream of the scalping unit 146.

In a further optional embodiment, the ore slurry 100 may be provided with any number of known additives such as frothing agents and the like prior to being fed to the cyclone separation stage 102. An example of such additives is provided in U.S. Pat. No. 5,316,664. As mentioned above, the solids components stream 128 shown in FIG. 1A-1C is transported to a tailings disposal site 149. In a preferred embodiment, the solids stream (which may comprise solely the solids component stream 128 from the cyclone facility 102 or a combined solids stream including the fine solids stream 144 from the water recovery unit 140) is pumped to a tailings pond where the solids are allowed to settle thereby allowing the water to be drawn off. In one embodiment, a rheology modifier or other such additive may be added to the solids stream in order to enhance settlement of the solids material. An example of such an additive is described in PCT publication WO/2004/9698 19 to Ciba Specialty Chemicals Water Treatments Limited. The solids stream may be passed through various known equipment such as belt filters, stacking cyclones and the like prior to deposit into tailings disposal site 149.

Throughout the above discussion, various references have been made to pumping, transporting, conveying etc. various materials such as slurries, froth and tailings and others. It will be understood that the various equipment and infrastructure such as pumps, conveyor belts, pipelines etc. required by these processes will be known to persons skilled in the art and, therefore, the presence of such elements will be implied if not otherwise explicitly recited.

Although the present invention has been described in some detail by way of example for purposes of clarity and understanding, it will be apparent that certain changes and modifications may be practiced within the scope of the appended claims.

What is claimed is:

1. A process for separating a bitumen froth stream containing bitumen froth, water and fine solids into a bitumen enriched froth stream and a water and fine solids stream, the process comprising:
   receiving the bitumen froth stream in a concentrator vessel;
   distributing the bitumen froth stream in the concentrator vessel as a substantially uniform and generally horizontal flow of the bitumen froth stream at a first flow velocity;
   slowing the bitumen froth stream to a second flow velocity, slower than the first flow velocity, in a separation region of the concentrator vessel to promote separation of the bitumen froth from the water and fine solids, the bitumen froth accumulating as a bitumen froth layer atop a water layer with the fine solids settling within the water layer;
   collecting the bitumen froth layer as the bitumen enriched froth stream; and
   collecting the water layer and fine solids as the water and fine solids stream.

2. The process of claim 1 wherein the bitumen froth layer is continuously collected at an overflow outlet while the water layer and fine solids stream is continuously collected at an underflow outlet.

3. The process of claim 2 wherein:
   the bitumen froth layer travels a first distance across the separation region before being collected at the overflow outlet;
   the water layer and fine solids travel a second distance across the separation region before being collected at the underflow outlet; and
   wherein the second distance is at least as large as the first distance.

4. The process of claim 2 further comprising inducing gravity-aided flow of the water layer and fine solids toward the underflow outlet with a downwardly inclined floor section ending proximate the underflow outlet.

5. The process of claim 1 wherein the concentrator vessel has first and second ends and wherein:
   receiving the bitumen froth stream comprises receiving the bitumen froth stream proximate the first end of the concentrator vessel;
   collecting the bitumen froth layer comprises collecting at least a portion of the bitumen froth layer proximate the second end of the concentrator vessel; and
   collecting the water layer and fine solids comprises collecting at least a portion of the water layer and fine solids proximate the second end of the concentrator vessel.

6. The process of claim 1 wherein the concentrator vessel has first and second ends and wherein:
   (a) receiving the bitumen froth stream further comprises receiving the bitumen froth stream proximate the first end of the concentrator vessel; and
   (b) collecting the bitumen froth layer further comprises:
      (i) collecting at least a first portion of the bitumen froth layer proximate the first end of the concentrator vessel, and
      (ii) collecting at least a second portion of the bitumen froth layer proximate the second end of the concentrator vessel.

7. The process of claim 6 wherein collecting the water layer and fine solids further comprises collecting at least a portion of the water layer and fine solids proximate the first end of the concentrator vessel.

8. The process of claim 1 wherein collecting the bitumen froth layer further comprises collecting at least a portion of the bitumen froth layer at an overflow weir oriented to be generally parallel to the direction of the first flow velocity.

9. The process of claim 1 further comprising directing the water layer to form a continuous flow having a downward inclination in the separation region, to facilitate fine solids that settle in the water layer to continue being transported downward by gravity towards at least one underflow outlet, the downward inclination of the continuos flow being bounded by a downward slope of a downwardly inclined floor.

10. The process of claim 9 wherein the downward slope is about 3 to 3.5 percent.

11. The process of claim 1 wherein slowing the bitumen froth stream from the first flow velocity to the second flow velocity further comprises:
   directing the bitumen froth stream to flow in a channel of the concentrator vessel from a first portion to a second portion of the channel, the bitumen froth stream flowing at the first flow velocity in the first portion of the channel and at the second flow velocity in the second portion of the channel, wherein the second portion of the channel is wider than the first portion of the channel, with width being measured along a direction perpendicular to a centerline of the flow of the bitumen froth stream between the first and second portions in a horizontal plane intersecting the first and second portions of the channel.

12. The process of claim 11 wherein the volumetric flow rate of the bitumen froth stream at the first and second portions of the channel is the same.

13. The process of claim 11 wherein the channel comprises a gradually widening channel portion between the first and second portions of the channel.

14. The process of claim 11 wherein collecting the bitumen froth layer comprises collecting at least a portion of the bitumen froth layer with an overflow weir disposed downstream of the second portion of the channel and oriented to be generally perpendicular to the centerline of the flow of the bitumen froth stream between the first and second portions of the channel.

15. The process of claim 14 wherein collecting the bitumen froth layer further comprises collecting at least a portion of the bitumen froth layer with an overflow weir oriented in a direction generally parallel to the centerline of the flow of the bitumen froth stream between the first and second portions of the channel.

16. The process of claim 1 further comprising:
(a) at an upstream separation facility, located upstream of the concentrator vessel, separating an oil sand slurry containing bitumen, solids and water into:
  (i) a solids component stream, and
  (ii) the bitumen froth stream; and
(b) recovering water from the water and fine solids stream and providing at least some of the recovered water to the upstream separation facility.

17. The process of claim 16 further comprising separating the water and fine solids stream into a water stream and a fine solids stream at a location downstream of an underflow outlet of the concentrator vessel.

18. The process of claim 1 further comprising:
turning at least a first portion of the flow of the bitumen froth stream in a direction generally opposite to that of the first flow velocity; and
collecting at least a portion of the bitumen enriched froth stream from the turned portion of the flow of the bitumen froth stream.

19. The process of claim 18 wherein the separation region comprises at least one generally vertically-oriented barrier forming a turn and facilitating the turning of at least the first portion of the flow of the bitumen froth stream through substantially 180 degrees.

20. The process of claim 19 wherein the separation region comprises flow redirection means for promoting smooth redirection of the flow while at least the first portion is turning.

21. The process of claim 1 wherein the separation region comprises froth layer flow enhancement means for enhancing flow of the bitumen froth layer to prevent formation of stagnant regions in the separation region.

22. The process of claim 1 wherein collecting the bitumen froth layer comprises collecting the bitumen froth layer in a froth launder.

23. The process of claim 22 wherein collecting the bitumen froth layer comprises permitting any bitumen froth that exits an underflow outlet with the water and fine solids to overflow into the froth launder.

24. The process of claim 1 wherein collecting the bitumen froth layer comprises overflowing the bitumen froth layer over at least one weir.

25. The process of claim 1 further comprising:
isolating the bitumen froth stream from the separation region in an enclosure and conditioning the bitumen froth stream to establish the substantially uniform and generally horizontal flow to reduce turbulence intensity in the separation region.

26. The process of claim 1 wherein the concentrator vessel comprises a removable solids clean out box for cleaning out any accumulated fine solids.

27. The process of claim 1 wherein:
collecting the bitumen froth layer comprises collecting a first portion of the bitumen froth layer at a first overflow weir section having a first height while collecting a second portion of the bitumen froth layer at a second overflow weir section having a second height, lower than the first height.

* * * * *